US005513552A

United States Patent [19]

Ardelt

[11] Patent Number: 5,513,552

[45] Date of Patent: May 7, 1996

[54] SINGLE LEVER CONTROL SYSTEM WITH TORQUE-AMPLIFYING DEVICE

[75] Inventor: Clarence A. Ardelt, Wheaton, Ill.

[73] Assignee: Komatsu Dresser Company, Lincolnshire, Ill.

[21] Appl. No.: 493,726

[22] Filed: Jun. 22, 1995

[51] Int. Cl.$^6$ .............................. F15B 11/00; F16H 21/44

[52] U.S. Cl. .............................................. 91/522; 74/97.1

[58] Field of Search ....................... 91/521, 522; 74/97.1, 74/100.1

[56] References Cited

U.S. PATENT DOCUMENTS

| | | | |
|---|---|---|---|
| 2,329,898 | 9/1943 | Henning | 74/97.1 |
| 3,014,377 | 12/1961 | Anderson et al. . | |
| 3,316,776 | 5/1967 | Schroter . | |
| 3,910,133 | 10/1975 | Oestmann . | |
| 4,232,566 | 11/1980 | Lemke et al. | 74/97.1 X |
| 4,485,689 | 12/1984 | Cambria . | |
| 5,134,895 | 8/1992 | Harmon et al. . | |
| 5,165,486 | 11/1992 | Davidson | 74/97.1 X |
| 5,187,998 | 2/1993 | Asano et al. | 74/97.1 X |
| 5,232,057 | 8/1993 | Renard . | |
| 5,277,258 | 1/1994 | O'Dell . | |
| 5,288,198 | 2/1994 | Mozingo . | |
| 5,316,435 | 5/1994 | Mozingo . | |

OTHER PUBLICATIONS

Dresser Industries Inc. "Parts Manual, Models TD7G, TD8G, 100G, 125G Crawler Tractors Form 1128 200 H1", pp. 10–048, 10–056, 10–049, 10–056, 10–057 (Feb. 1, 1988).

Caterpillar Tractor Co. "Parts D5H & D5H LGP Tractors Direct Drive, Powered by 3304 Engine", pp. 256–262 (Jan. 1986).

John Deere Dubuque Works "Parts Catalog John Deere 450D Crawler Bulldozer" pp. 3215–1, 3215–2, 3215–3 (Jun. 10, 1983).

*Primary Examiner*—Hoang Nguyen
*Attorney, Agent, or Firm*—Edward G. Fiorito

[57] ABSTRACT

This invention provides a three-function control mechanism that employs a single control lever for controlling a first, a second and a third actuator and which may be used in connection with a bulldozer. A torque-amplifying device is provided for assisting in the activation of at least one of the actuators. The control mechanism includes a control bracket, a control handle, and first, second, and third bellcranks pivotably supported by the control bracket. The control mechanism further includes first, second, and third linkage that interconnect the control lever, through the bellcranks, to respective ones of the first, second, and third actuators. The torque-amplifying device is coupled to at least one of the bellcranks in order to assist in the pivoting of the bellcrank. Due to the supporting an arrangement of the control lever, bellcranks, and linkage, the control lever may be moved forward or backward, twisted clockwise or connterclockwise, or moved side to side either separately or in unison. In doing so the control lever thereby respectively actuates the first, second, and third actuators.

14 Claims, 14 Drawing Sheets

SINGLE LEVER CONTROL SYSTEM WITH TORQUE-AMPLIFYING DEVICE

BACKGROUND OF THE INVENTION

The present invention relates generally to control mechanisms and, more specifically, to a three-function control mechanism that employs a single control lever in order to actuate or move three separate actuators. The present invention further relates to a three-function control mechanism that is provided with a torque-amplifying device for assisting in the actuating of at least one of the actuators when the single control lever is operated. The present invention is particularly applicable for use on a work vehicle, such as a bulldozer or loader, in order to actuate hydraulic cylinders that control the positioning of a blade or shovel carried by the work vehicle.

Many bulldozers and loaders are provided with elaborate control systems that allow an operator to adjust or change the position of the blade or shovel. Without limiting the applicability of the present invention to the control of a bulldozer blade, the invention will be described hereinafter in connection with a bulldozer, it berg understood that the invention may be applicable to other work vehicles or other apparatus. Typically, the adjustments made by existing control systems to the bulldozer blade may include the following three movements: (1) raising and lowering of the blade; (2) the tilting of the blade about a first axis; or (3) angling of the blade about a second, mutually-perpendicular axis.

A typical bulldozer usually will have hydraulic cylinders that are coupled to the blade and that may be extended or retracted to change the position of the blade. The flow of hydraulic fluid to and from the hydraulic cylinders is typically controlled by corresponding valve systems that are actuated by movement of one or more control levers by the operator. Manipulation of more than one control lever in order to change the position of the blade can, however, be cumbersome to the operator. Furthermore, in one known control system where a single control lever is used, a significant number of parts are employed making the system relatively expensive to manufacture and assemble.

In many existing control systems, the operator may be required to twist the control handle in order to actuate one of the valve systems. The control handles usually must act against springs that are provided in the valve systems for holding the valve systems in a home or neutral position. Due to the limited available twisting motion of a human wrist, an operator may have difficulty overcoming the spring action and actuating one of the valve systems. When the operator twists the control handle, the handle can only move through a relatively short arc. This short arc produces a very limited lever advantage as compared to the lever advantage created when the control handle is moved either back and forth or side to side.

It is therefore desirable and an object of the present invention to provide a hydraulic control mechanism which features a single lever for actuating the valve systems. Another object is to provide a hydraulic control mechanism that has at least one torque-amplifying device for assisting in the actuating of the valve systems. It is a further object of the present invention to provide a hydraulic control mechanism that is relatively uncomplicated having relatively few main parts and which can carry out each of the three functions (lift, tilt, and angle) independently or in unison

SUMMARY OF THE INVENTION

The present invention provides a three-function control mechanism that employs a single lever for actuating three different actuators. The control mechanism is provided with a torque-amplifying device for assisting in the activation of at least one of the actuators. Such a three-function mechanism may be used in a work vehicle such as a tractor or bulldozer to control the movement of the work vehicle blade.

The three-function comprises a control bracket and a control handle that is movable between a neutral position and an activated position whereby at least one of the actuators is activated. Control linkage operatively couples the control handle and to each of the three actuators.

The control linkage comprises a control bellcrank that is rotatably coupled to the control bracket such that the control bellcrank is rotatable about a first axis. An input control lever, coupled to the control handle, is mounted to the control bellcrank. Also mounted to the control bellcrank is an output control lever that is operatively coupled to the first actuator. The input control lever and the output control lever are rotatable with the control bellcrank about the first axis.

The control linkage also includes a torque-amplifying device that assists the input and output control levers in rotating about the first axis. The torque-amplifying device comprises a torque-assist lever mounted to the control bellcrank such that the torque-assist lever is rotatable about the first axis together with the control bellcrank. A housing is pivotably connected to the torque-assist lever so that the housing is pivotable with respect to the torque-assist lever about a second axis. The housing has a chamber and at least one opening to the chamber.

A compression spring is positioned within the chamber of the housing with a first end of the spring positioned near the opening of the chamber. A pivot is coupled to the first end of the compression spring and to the control bracket so that the compression spring is pivotable about a third axis with respect to the control bracket.

The first, second and third axes lie substantially within the same plane when the control handle is in the neutral position. When the control handle is activated, the input and output control levers and the torque-assist lever move. As the torque-assist lever moves, it pulls the housing and spring to one side causing the third axis to move out of the plane.

In a preferred embodiment of the invention, the pivot interconnecting the compression spring and the control bracket comprises a hardened sphere that is seated against the first end of the compression spring and against the control bracket. The spring pivots about the sphere when control handle is moved into an activated position.

The torque-amplifying device may be provided with an adjustment device for adjusting the force of the compression spring. In a preferred embodiment of the invention, the adjustment device comprises an adjustment screw threadingly coupled to the housing and pressingly coupled to a second end of the compression spring.

BRIEF DESCRIPTION OF THE DRAWINGS

Other advantages and features of the invention will become more apparent with reference to the following detailed description of a preferred embodiment of the invention in connection with the accompanying drawings, wherein like reference numerals have been applied to like elements, in which.

Throughout the specification, the terms "forward", "rearward", "side", "right", and "left", "up", and "down" are used for convenience in describing the invention. These terms are not intended to be limiting.

DETAILED DESCRIPTION

I. The Bulldozer and Blade

Figure 1:
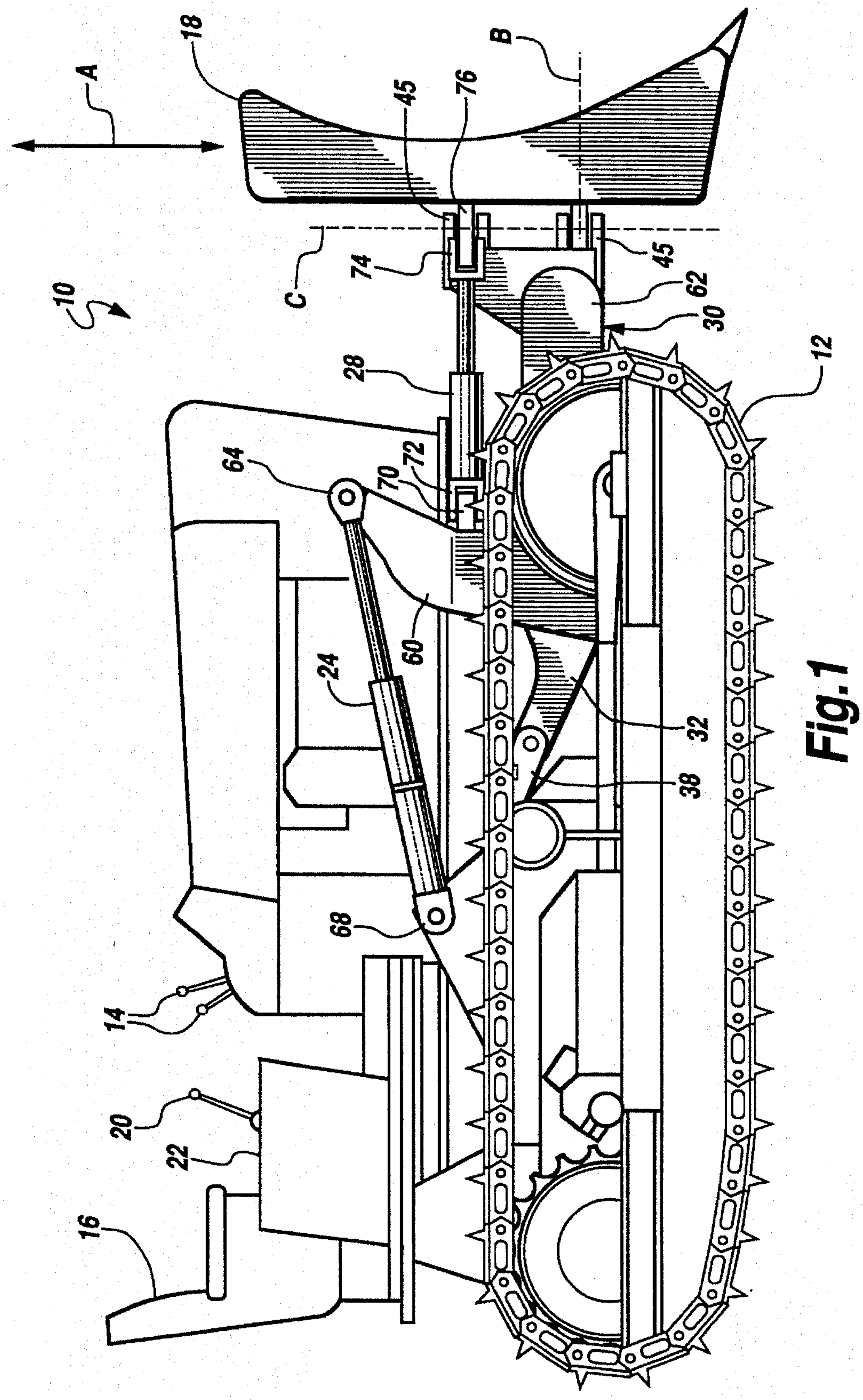
FIG. 1 is a side view of a bulldozer incorporating the principles of the present invention.

FIG. 1 illustrates a bulldozer 10 having a pair of continuous drive tracks for moving the bulldozer 10 forward or backward as well as for turning the bulldozer 10. Only one track 12 is shown with the other being positioned on the opposite side of the bulldozer. Control levers 14 are provided near the operator's seat 16 to control the operation of the drive tracks 12 and thereby the movement of the bulldozer 10.

Figure 2A:
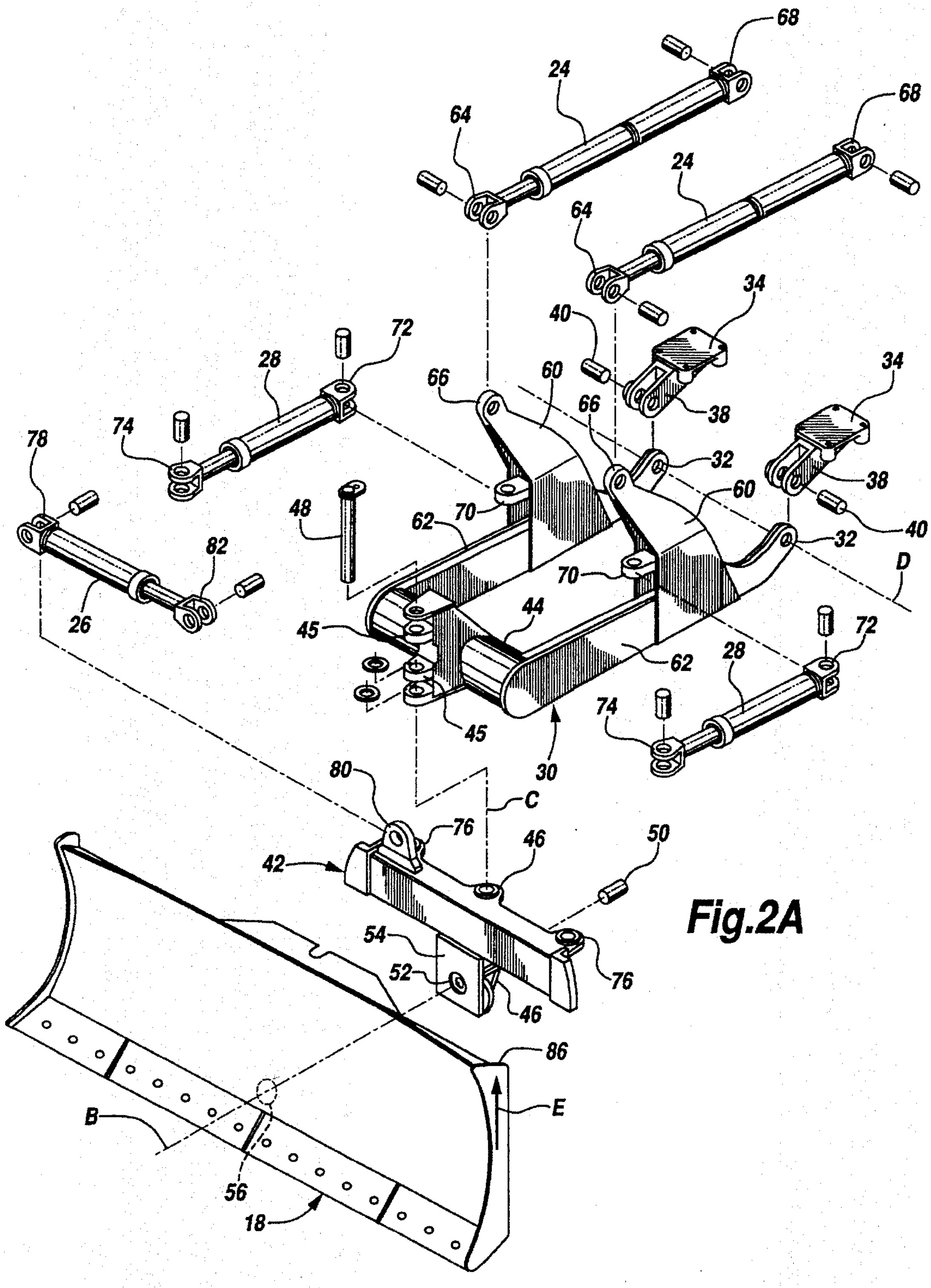
FIG. 2A is an enlarged exploded perspective view of the forward end of the bulldozer of FIG. 1 turned approximately 180 degrees, illustrating the bulldozer blade, hydraulic cylinders, and blade support assembly.

Located at the forward end of the bulldozer 10 is a blade 18 that may be lifted up and down as indicated by arrow A, tilted to one side or another about generally-horizontal axis B, and angled to one side or another about generally-vertical axis C. The lifting, tilting, or angling of the blade 18 is controlled by manipulating a control handle 20 that is coupled to a three-function control mechanism (not shown in FIG. 1) contained in a housing 22. The three-function control mechanism is coupled to a series of lift, tilt, and angle hydraulic cylinders 24, 26, and 28, respectively, that may be selectively actuated by operation of the handle 20 in order to adjust the position of the blade 18 (tilt cylinder 26 is shown in FIG. 2A). Preferably, each of the hydraulic cylinders 24, 26, and 28 is a conventional, dual-acting type cylinder that has first and second fluid chambers which may be selectively filled with hydraulic fluid to cause the cylinder to either extend or retract.

A. The Blade Support Assembly

Figure 2B:
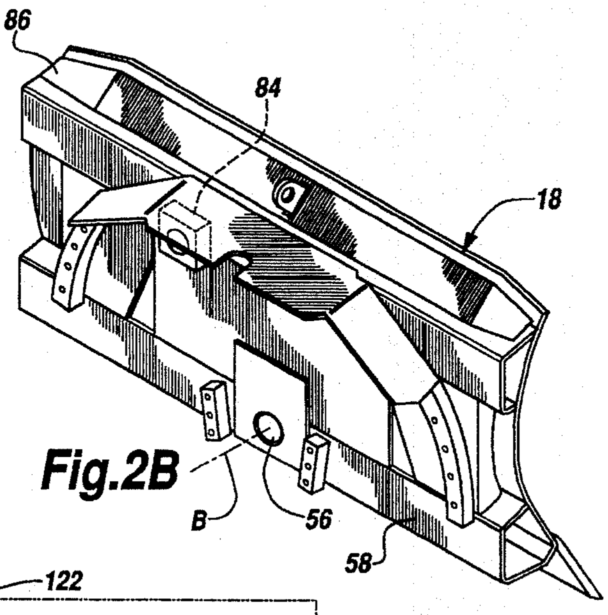
FIG. 2B is a perspective view of the bulldozer blade illustrating the backside of the blade.

With reference to FIGS. 2A and 2B (FIG. 2A is turned approximately 180 degrees with respect to FIG. 1), the bulldozer 10 includes a substantially U-shaped frame 30 that supports the blade 18. The free ends 32 of the U-shaped frame 30 are pivotably mounted to respective trunnions 34 that are fixed to the body of the bulldozer 10. The trunnions 34 are each provided with a clevis 38 in which a respective end 32 of the U-shaped frame is inserted and held in place by a respective pin 40.

An angling frame 42 is pivotably mounted to the cross-leg 44 of the U-shaped frame 30. The cross-leg 44 of the U-shaped frame 30 is provided with two vertically-spaced clevises 45 which receive respective horizontal tab extensions 46 provided on the angling frame 42. A pin 48 holds the tab extensions 46 in place.

The blade 18 in turn is pivotably mounted to the angling frame 38 by a pin 50 that passes through both a hole 52 provided in a lower portion 54 of the angling frame 42 and a hole 56 provided in a lower bracket 58 (FIG. 2B) attached to the back side of the blade 18.

As a result of the aforementioned mounting arrangement, the blade 18, along with the U-shaped frame 30, may pivot about horizontal axis D, thereby allowing the blade 18 to be lifted or lowered. Furthermore, the blade 18 may be pivoted about generally horizontal axis B, thereby allowing the blade 18 to be tilted. The blade 18 may also be pivoted about generally vertical axis C, thereby allowing the blade 18 to be angled to the left or right.

The U-shaped frame 30 includes a pair of posts 60 that extend upwardly from respective side legs 62 of the U-shaped frame 30. One end 64 of each lift cylinder 24 is pivotably mounted to a respective end 66 of the posts 60. The opposing ends 68 of the lift cylinders 24 are pivotably mounted to the body of the bulldozer 10 so that the lift cylinders 24 extend rearwardly from the posts 60 on either side of the bulldozer 10.

The posts 60 are each provided with a horizontal tab extension 70 to which respective ends 72 of the angle cylinders 28 are pivotably attached. The opposing ends 74 of the angle cylinders 28 are pivotably mounted to respective horizontal tab extensions 76 provided on the angling frame 42 so that the angle cylinders 28 extend forwardly from the posts 60 on either side of the bulldozer 10.

The tilt cylinder 26 extends traversely across a portion of the back side of the blade 18. One end 78 of the tilt cylinder 26 is pivotably mounted to a vertical tab extension 80 provided on the right upper portion of the angling frame 42. The opposing end 82 of the tilt cylinder 28 is pivotably mounted to a lug 84 (FIG. 2B) attached to the left upper portion of the back side of the blade 18.

1. Lifting of Blade

Lifting of the blade 18 is accomplished by moving both of the lift cylinders 24 into their retracted positions, and lowering of the blade 18 is accomplished by extending the lift cylinders 24. As the lift cylinders 24 retract, the posts 60 of the U-shaped frame 30 are pulled backward causing the U-shaped frame 30 to pivot about axis D and the blade 18 to move upwardly as indicated by arrow A in FIG. 1. The U-shaped frame 30 pivots in the opposite direction when the lift cylinders 24 extend and the blade 18 is thereby lowered.

2. Tilting of Blade

Tilting of the blade 18 is accomplished by extending or retracting the tilt cylinder 26 which causes the left upper comer 86 of the blade 18 to raise or lower. As the tilt cylinder retracts, it forces the left upper comer 86 of the blade 18 to raise, as indicated by arrow E in FIG. 2A. The entire blade 18 thereby pivots about the B axis with respect to the angling frame 42. Extension of the tilt cylinder 26 causes the left upper comer 86 to lower and the entire blade to pivot in the opposite direction.

3. Angling of Blade

Angling of the blade 18 to the left side or right side is accomplished by retracting one of the angle cylinders 28 and extending the other so that one side of the blade 18 is moved backward and the other side is moved forward as the blade 18 pivots about axis C. For example, the blade 18 may be angled to the left (as viewed from the operator's seat 16) by retracting the left angle cylinder 28 (the cylinder on the operator's left side) and extending the right angle cylinder 28 (the cylinder on the operator's right side). Angling of the blade 18 to the right may be accomplished by retracting the right angle cylinder 28 and extending the left angle cylinder.

II. Hydraulic Valve Unit

Figure 3:
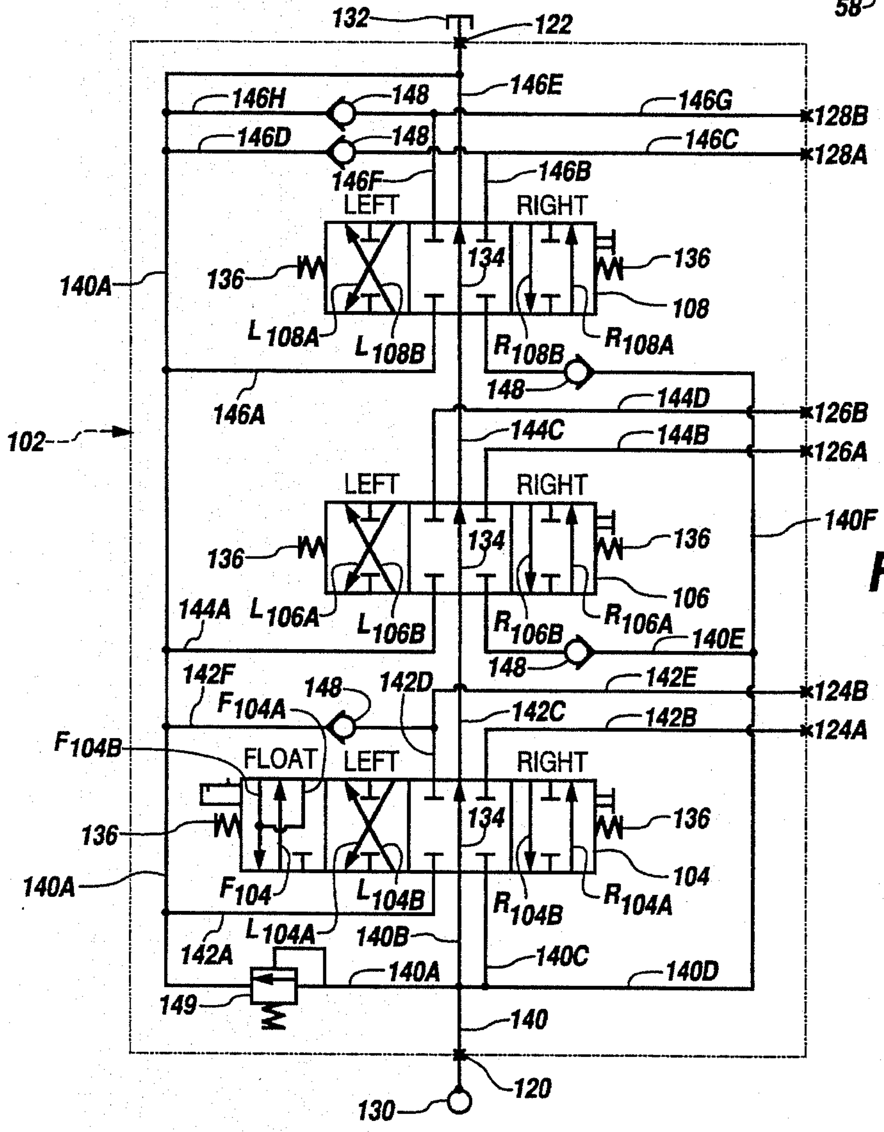
FIG. 3 is a schematic view of a hydraulic valve unit coupled to the three-function control mechanism.

FIG. 3 illustrates an hydraulic valve unit 102 that is coupled to the three-function control mechanism (explained in more detail below). The hydraulic valve unit 102 controls the extension and retraction of the lift, tilt, and angle hydraulic cylinders 24, 26, and 28, respectively, and, therefore, controls the lifting, tilting, and angling of the blade 18. The hydraulic valve unit 102 comprises three separate valve spools: lift valve spool 104, tilt valve spool 106, and angle valve spool 108, that control the flow of hydraulic fluid to either the first or the second chamber of the dual-acting hydraulic cylinders 24, 26, and 28. By selectively moving the handle 20, the three-function control mechanism 200 can either individually or simultaneously move the three spools 104, 106, and 108 to the left or right and thereby control the flow of hydraulic fluid to the hydraulic cylinders 24, 26, and 28.

As explained in more detail further below, movement of the handle 20 forward (or rearward) causes the lift valve spool 104 to move to the left (or right), the hydraulic fluid to flow so as to extend (or retract) the lift cylinders 24, and the blade 18 to consequently lower (or raise). Movement of the handle 20 to the left (or right) (as viewed by the operator) causes the tilt valve spool 106 to move to the right (or left), hydraulic fluid to flow so as to extend (or retract) the tilt cylinder 26, and the blade 18 to tilt to the left (or right), i.e., the left upper comer 86 of the blade 18 to lower (or raise). Twisting of the handle clockwise (or counterclockwise) (as viewed from above) causes the angle valve spool 108 to move to the right (or left), hydraulic fluid to flow so as to extend (or retract) the left angle cylinder and retract (or extend) the right angle cylinder 28, and the blade 18 to angle to the right (or left).

Hydraulic fluid enters the hydraulic valve unit 102 through an inlet port 120 provided at one end of the unit 102 and exits through either an outlet port 122 provided at the opposing end or through selective working ports 124A, 124B, 126A, 126B, 128A, and 128B that are fluidically coupled to respective ones of the three spools 104, 106, and 108, as well as to respective ones of the hydraulic cylinders 24, 26, and 28.

Lift spool 104 is fluidically coupled to the two working ports 124A and 124B. Port 124A is further fluidically coupled to the first chambers of both the left and right lift cylinders 24, and port 124B is fluidically coupled to the second chambers of the left and right lift cylinders 24.

Tilt spool 106 is fluidically coupled to the two working ports 126A and 126B. Port 126A is further fluidically coupled to the first chamber of the tilt cylinder 26, and port 126B is fluidically coupled to the second chamber of the tilt cylinder 26.

Angle spool 108 is fluidically coupled to the two working ports 128A and 128B. Port 128A is further fluidically coupled to the first chamber of the left angle cylinder 28 and the second chamber of the right angle cylinder 28, and port 128B is fluidically coupled to the second chamber of the left angle cylinder 28 and the first chamber of the right angle cylinder 28.

With further reference to FIG. 3 the inlet port 120 of the hydraulic valve unit 102 is shown fluidically coupled to a hydraulic fluid source 130 that pumps hydraulic fluid into the unit 102, and the outlet port 122 is shown fluidically coupled to an hydraulic fluid sink or main reservoir 132. Each of the lift, tilt and angle valve spools 104, 106, and 108 can be moved into one of three positions: a left or right position, as indicated by the reference terms "LEFT" and "RIGHT" in FIG. 3, or a neutral position, the position in which all three spools 104, 106, and 108 are shown in FIG. 3. The lift valve spool 104 can additionally be moved into a "float" position, as represented by the reference term "FLOAT".

With each of the spools 104, 106, and 108 in its neutral position as shown in FIG. 3, hydraulic fluid enters the unit 102 through the inlet port 120, passes through the spools 104, 106, and 108, as shown by arrows 134, and exits the unit 102 through the outlet port 122. Each of the spools 104, 106, and 108 is biased into its neutral position by spring assemblies 136 in a conventional manner. Accordingly, if a particular spool 104, 106, or 108 is not being forced into its up or down position by the handle 20, then the respective spring assembly 136 will return and hold the spool in its neutral position.

The hydraulic valve unit 102 further includes a number of fluid lines interconnecting the fluid source 130, main reservoir 132, and working ports 124A, 124B, 126A, 126B, 128A, 128B with the valve spools 104, 106, and 108. The following outlines the flow of hydraulic fluid through the hydraulic valve unit 102 dependent upon the position of a valve spool.

1. Right Position of Lift Valve Spool 104 (Handle 20 in Rearward Position)

A. Hydraulic fluid flows from fluid source 130 through fluid lines 140 and 140C, through lift valve spool 104 as indicated by arrow $R_{104A}$, through fluid line 142B, and out working port 124A to the first chambers of the hydraulic cylinders 24 causing the cylinders 24 to retract and the blade 18 to raise up;

B. Hydraulic fluid flows in working port 124B from the second chambers of the hydraulic cylinders 24, through fluid lines 142E and 142D, through lift valve spool 104 as indicated by arrow $R_{104B}$, through fluid lines 142A and 140A, and out outlet port 122 to main reservoir 132.

2. Left Position of Lift Valve Spool 104 (Handle 20 in Forward Position)

A. Hydraulic fluid flows from fluid source 130 through fluid lines 140 and 140C, through lift valve spool 104 as indicated by arrow $L_{104B}$, through fluid lines 142D and 142E, and out working port 124B to the second chambers of the hydraulic cylinders 24 causing the cylinders 24 to extend and the blade 18 to lower;

B. Hydraulic fluid flows in working port 124A from the first chambers of the hydraulic cylinders 24, through fluid line 142B, through lift valve spool 104 as indicated by arrow $L_{104A}$, through fluid lines 142A and 140A, and out outlet port 122 to main reservoir 132.

3. Float Position of Lift Valve Spool 104 (Handle 20 in Maximum Forward Position)

A. Hydraulic fluid flows from fluid source 130, through fluid lines 140 and 140B, through lift valve spool 104 as indicated by arrow $F_{104}$, through fluid line 142C, and, provided the tilt valve spool 106 and angle valve spool 108 are in their neutral positions, through tilt valve spool 106, fluid line 144C, angle valve spool 108, and fluid line 146E, and out outlet port 122 to main reservoir 132;

B. Hydraulic fluid flows in both working ports 124A and 124B from both the first and second chambers of the hydraulic cylinders 24, through fluid lines 142B, 142E and 142D, through valve spool 104 as indicated by arrows $F_{104A}$ and $F_{104B}$, through fluid lines 142A and 140A, and out outlet 122 to main reservoir 132.

4. Left Position of Tilt Valve Spool 106 (Handle 20 Moved to Operator's Right Side)

A. Hydraulic fluid flows from fluid source 130 through fluid lines 140, 140D and 140E, through tilt valve spool 106 as indicated by arrow $L_{106B}$, through fluid line 144B, and out working port 126A to the first chamber of hydraulic cylinder 26 causing cylinder 26 to retract and the upper left comer 86 of the blade 18 to raise;

B. Hydraulic fluid flows in working port 126B from the second chamber of the hydraulic cylinder 26, through fluid line 144D, through tilt valve spool 106 as indicated by arrow $L_{106A}$, through fluid lines 144A and 140A, and out outlet port 122 to main reservoir 132.

5. Right Position of Tilt Valve Spool 106 (Handle 20 Moved to Operator's Left Side)

A. Hydraulic fluid flows from fluid source 130 through fluid lines 140, 140D and 140E, through tilt valve spool 106 as indicated by arrow $R_{106A}$, through fluid line 144D, and out working port 126B to the second chamber of the hydraulic cylinder 26 causing the cylinder 26 to extend and the upper left comer of the blade 18 to lower;

B. Hydraulic fluid flows in working port 126A from the first chamber of the hydraulic cylinder 26, through fluid line 144B, through tilt valve spool 106 as indicated by arrow $R_{106A}$, through fluid lines 144A and 140A, and out outlet port 122 to main reservoir 132.

6. Right Position of Angle Valve Spool 108 (Handle 20 Twisted Clockwise)

A. Hydraulic fluid flows from fluid source 130 through fluid lines 140, 140D and 140F, through angle valve spool 108 as indicated by arrow $R_{108A}$, through fluid lines 146B and 146C, and out working port 128A to the second chamber of the left angle hydraulic cylinder 28 causing the left cylinder to extend and to the first chamber of the right angle hydraulic cylinder 28 causing the right cylinder to retract and the blade 18 to angle to the right;

B. Hydraulic fluid flows in working port 128B from the first chamber of the left angle hydraulic cylinder 28 and from the second chamber of the right angle hydraulic cylinder 28, through fluid lines 146G and 146F, through angle valve spool 108 as indicated by arrow $R_{108B}$, through fluid lines 146A and 140A, and out outlet port 122 to main reservoir 132.

7. Left Position of Angle Valve Spool 108 (Handle 20 Twisted Counterclockwise)

A. Hydraulic fluid flows from fluid source 130 through fluid lines 140, 140D and 140F, through angle spool 108 as indicated by arrow $L_{108B}$, through fluid lines 146F and 146G, and out working port 128B to the first chamber of the left angle hydraulic cylinder 28 causing the left cylinder 28 to retract and to the second chamber of the right angle hydraulic cylinder 28 causing the right cylinder 28 to extend and the blade 18 to angle to the left;

B. Hydraulic fluid flows in working port 128A from the second chamber of the left angle hydraulic cylinder 28 and from the first chamber of the right angle hydraulic cylinder 28, through fluid lines 146C and 146B, through angle valve spool 108 as indicated by arrow $L_{108A}$, through fluid lines 146A and 140A, and out outlet port 122 to main reservoir 132.

Check valves 148 are provided in fluid lines 140E, 140F, 142F, 146D, and 146H in order to prevent the reverse flow of hydraulic fluid through these lines. In addition, a bypass valve 149 is provided in fluid line 140A to allow the release of fluid to the main reservoir 132 if there is a an excessive build up of fluid pressure in fluid lines 140C, 140D, 140E, and 140F resulting in an excessive build up of fluid pressure in fluid line 140A upstream of the bypass valve.

So long as the valve spools 104, 106, and 108 are actuated by the handle 20 (i.e. held in either their up or down position), hydraulic fluid will continue to flow to and from the corresponding cylinder (or cylinders) until the cylinder (or cylinders) is fully extended or retracted. If, after the cylinder (or cylinders) is fully extended or retracted, the handle 20 is still held in its operating position, hydraulic fluid will be redirected inside the valve unit 102 to the main reservoir 132 by the bypass valve 149.

The FLOAT position of the valve spool 104 corresponds to a floating position of the blade 18. In such a position, the handle 20 is moved to an extreme forward position and held in place by a detent (not shown). Hydraulic fluid is not trapped in the cylinders 24. Consequently, the blade 18 lowers and is allowed to float, not being held in any set position. This floating feature is found in many conventional bulldozers and is desirable when, for example, the bulldozer moves in reverse and the blade 18 thereby is allowed to drag along the ground and can work to smooth the ground.

III. Three-Function Control Mechanism

Figure 4:
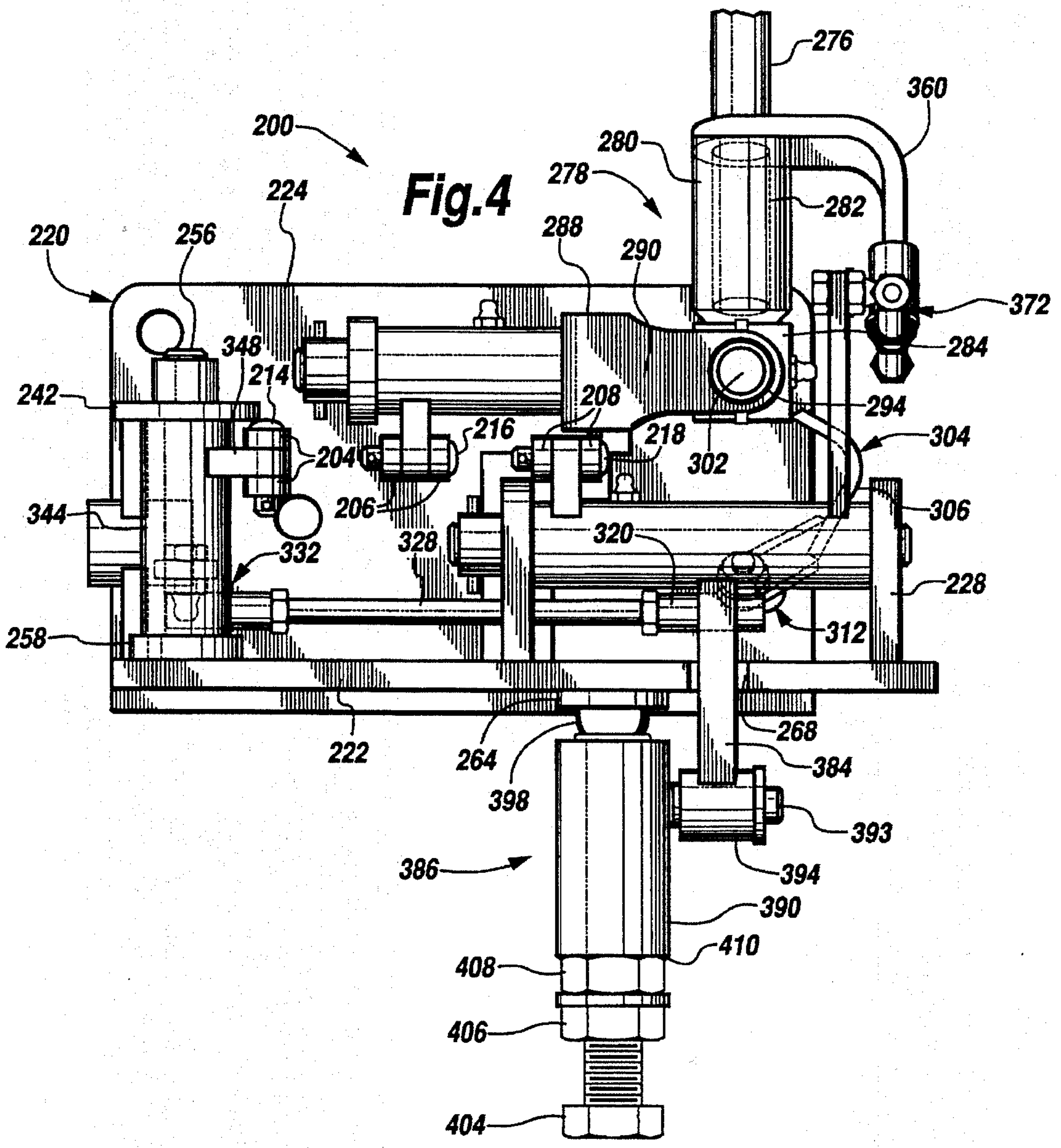
FIG. 4 is a side elevational view of a three-function control mechanism for controlling the position of the bulldozer blade and the hydraulic cylinders according to the present invention.
Figure 5:
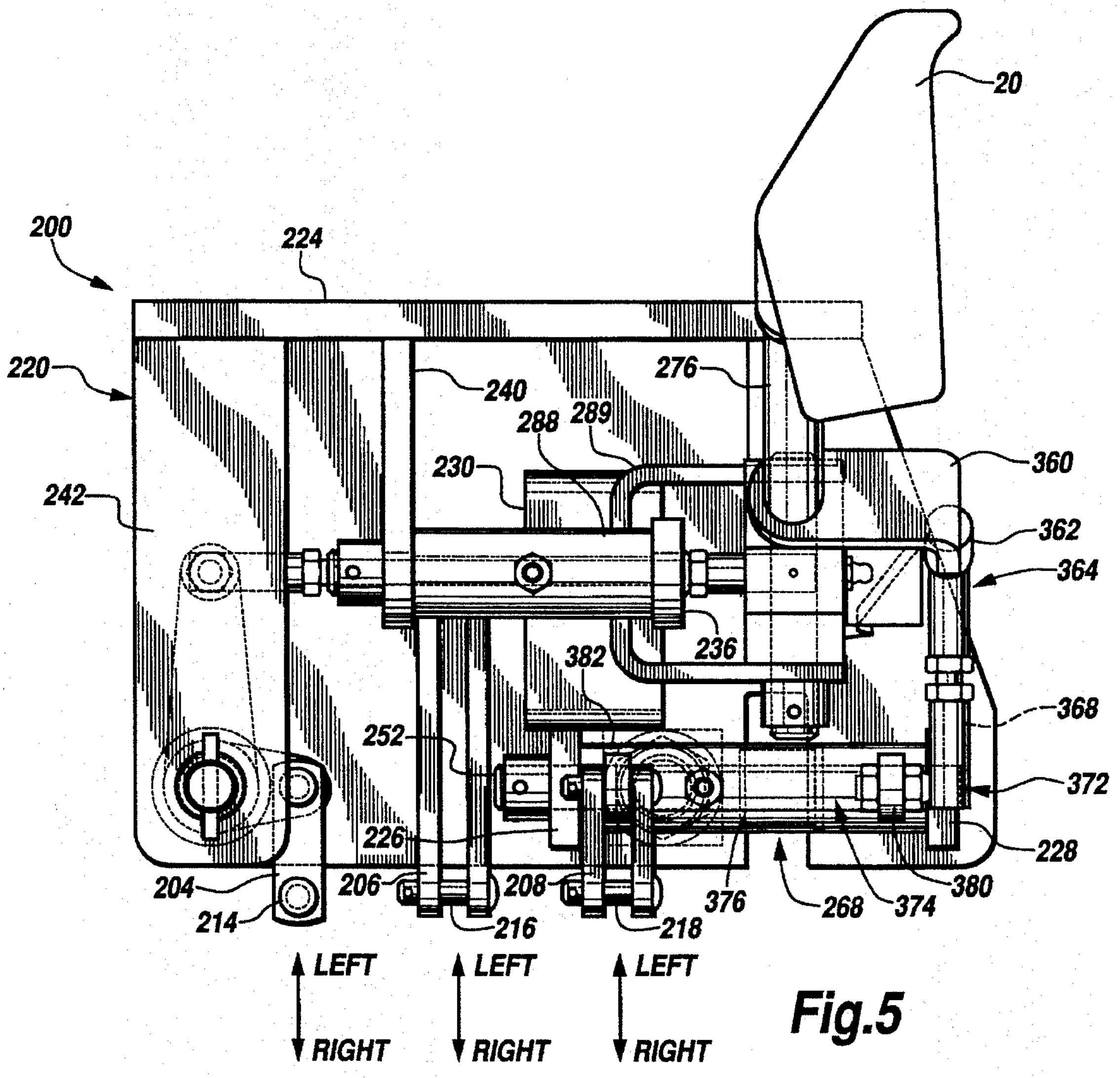
FIG. 5 is a top plan view of the three-function control mechanism of FIG. 4.
Figure 6:
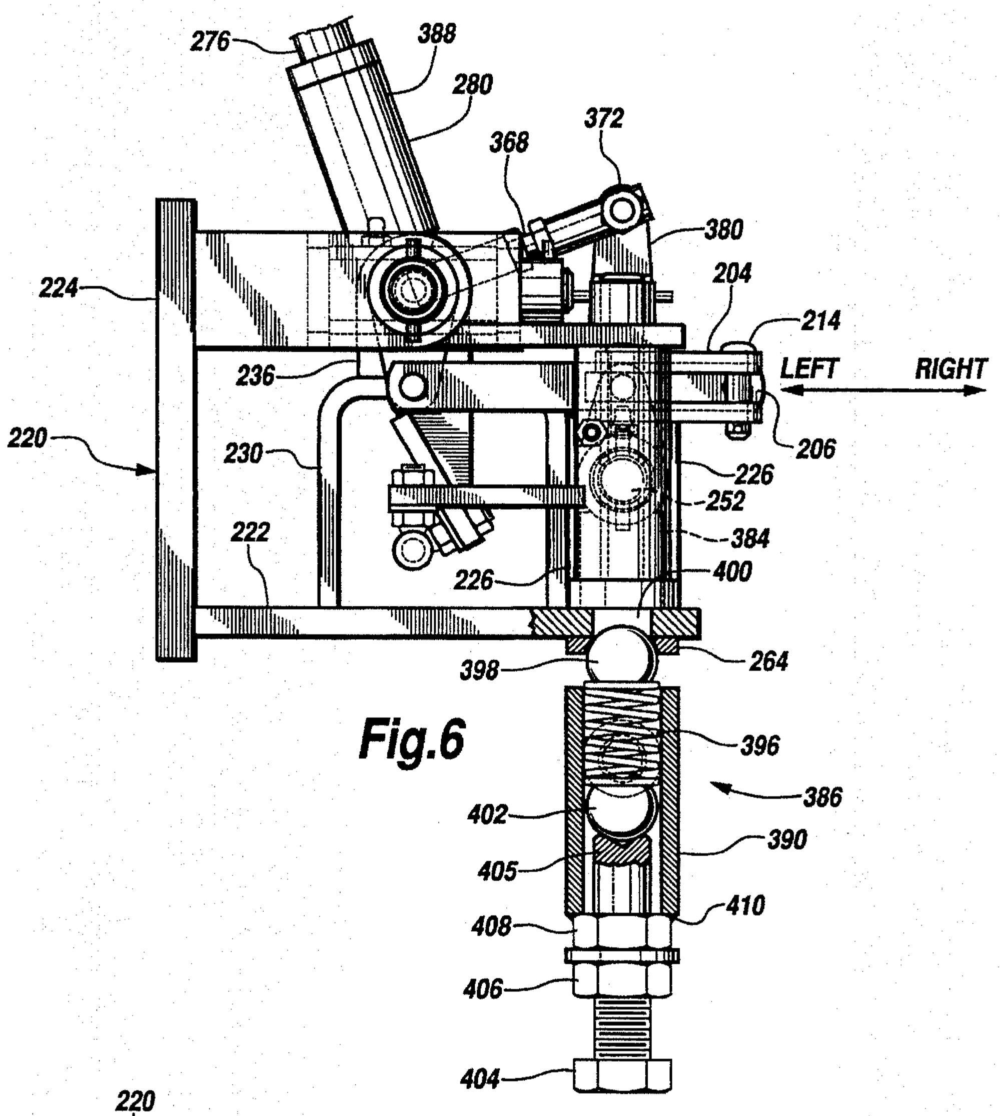
FIG. 6 is a end view of the three-function control mechanism of FIG. 4.

FIGS. 4–6 illustrate the three-function control mechanism 200. The term "three-function" in the phrase "three-function control mechanism" refers to the "lift", "tilt", and "angle" functions of the hydraulic valve unit 102 corresponding to the lifting, tilting, and angling of the blade 18. The three-function control mechanism 200 includes three links 204, 206, and 208 that are respectively coupled to the lift spool

104, tilt spool 106, and angle spool 108 by respective link pins 214, 216, and 218. As explained below, the three links 204, 206, and 208 are further mechanically coupled to the control handle 20 such that selective movement of the handle 20 causes the links 204, 206, and 208 to move to the left or right as indicated by the double-headed arrows marked "LEFT" and "RIGHT", thereby causing the spools 104, 106, and 108 to move to the left or right.

Figure 7A:
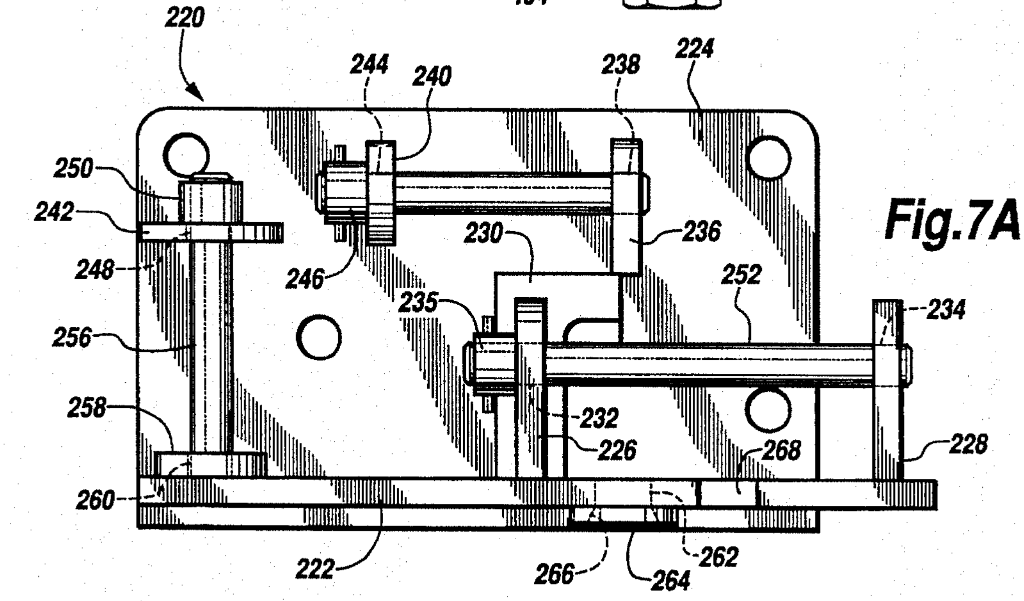
FIG. 7A is a side view of a control bracket forming a portion of the three-function control mechanism of FIG. 4.
Figure 7B:
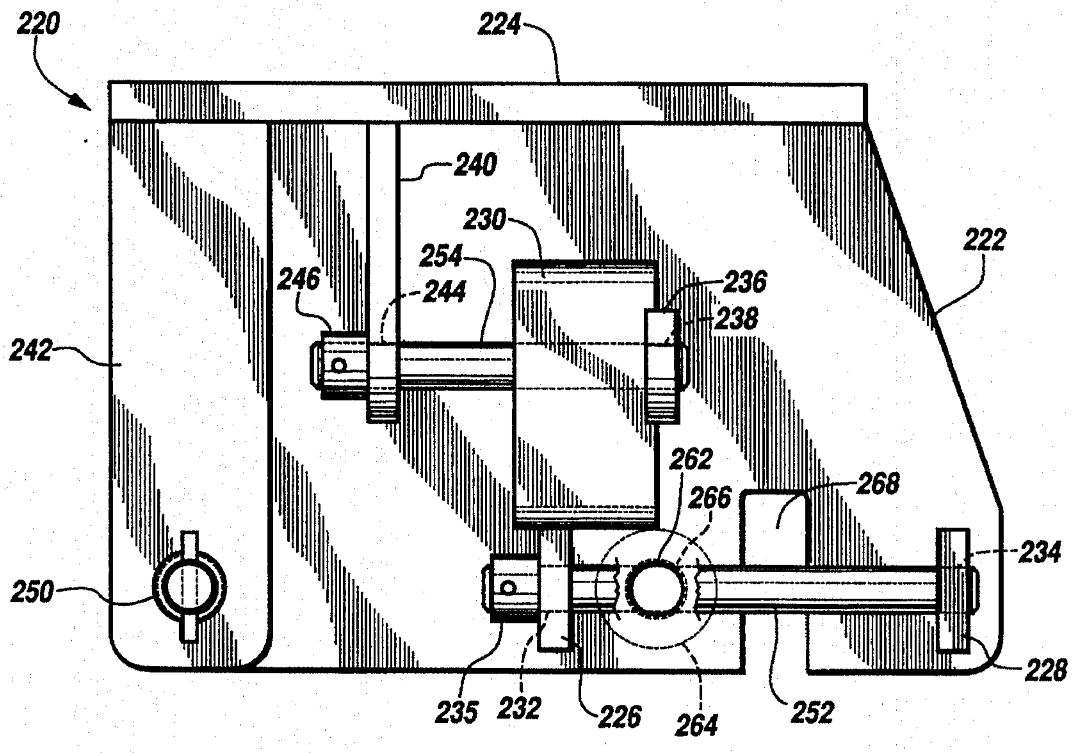
FIG. 7B is a top plan view of the control bracket of FIG. 7A.
Figure 7C:
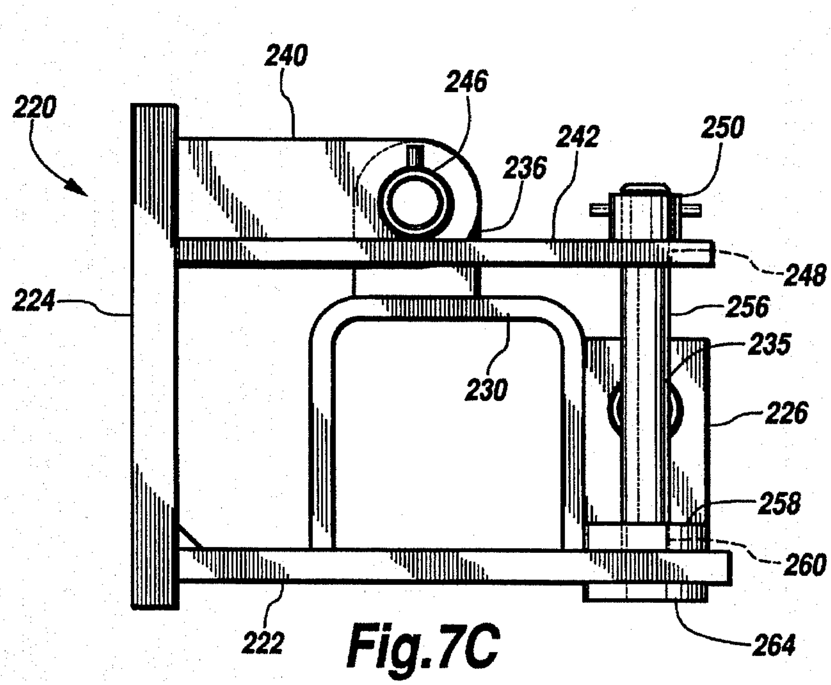
FIG. 7C is an end plan view of the control bracket of FIG. 7A.

With reference to FIGS. 7A, 7B, and 7C, the three-function control mechanism 200 comprises a control bracket 220. The control bracket 220 has a generally horizontal bottom wall 222 and a generally vertical side wall 224. Projecting upwardly from the bottom wall 222 of the control bracket 220 are three substantially vertical support members 226, 228, and 230. The first and second vertical support members 226 and 228 are generally flat with respective through holes 232 and 234 located near their upper ends. The first support member 226 further has a tubular flange 235 that is aligned with the through hole 232.

The third support member 230 has a generally U shape as viewed from the end (FIG. 7C). A generally flat vertical extension 236 projects upwardly from a forward and top portion of the U-shaped section of the third support 230. The extension 236 is provided with a through hole 238.

Projecting substantially horizontally from the side wall 224 are fourth and fifth support members 240 and 242. The fourth support member 240 is provided with a substantially horizontal through hole 244 and a tubular side flange 246 that is aligned with the horizontal through hole 244. The fifth support member 242 is provided with a vertical through hole 248 and a tubular flange 250 that extends upwardly from the upper surface of the support member 242.

As explained in more detail below, the first and second support members 226 and 228 support a first pin 252. The third and fourth support members 230 and 240 support a second pin 254, and the fifth support member 242 supports third pin 256. The third pin 256 extends between the fifth support member 242 and a circular block 258 that extends upwardly from the bottom wall 222. The circular block 258 has a through hole 260 that is vertically aligned with the through hole 248 of the fifth support member 242.

As will also be explained more detail below, the control bracket 220 is provided with a through hole 262 that extends through the bottom wall 222. A circular hardened flange or seat 264 having a through hole 266 extends below the bottom wall 222 in alignment with the through hole 262. The hole 266 extending through the flange 264 increases slightly in diameter. The bottom wall 222 of the control bracket 220 is also provided with a slot 268 positioned adjacent the hole 266 and flange 264.

A. Lift Function

Figure 8A:
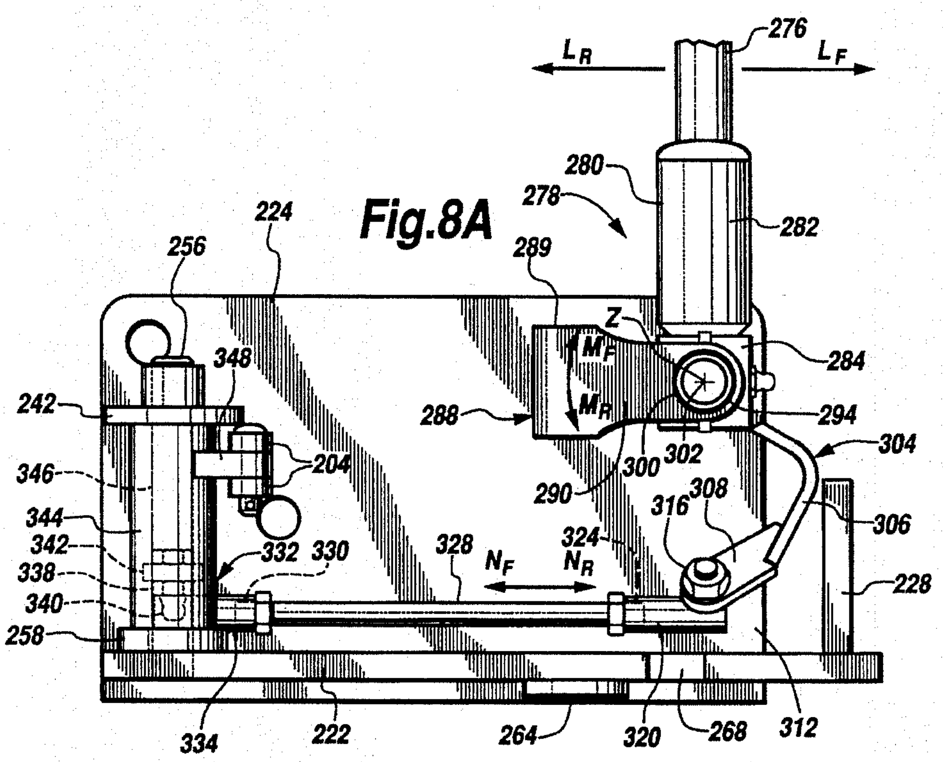
FIG. 8A is a side view of the three-function control mechanism of FIG. 4 illustrating those components involved in the lifting operation of the bulldozer blade.
Figure 8B:
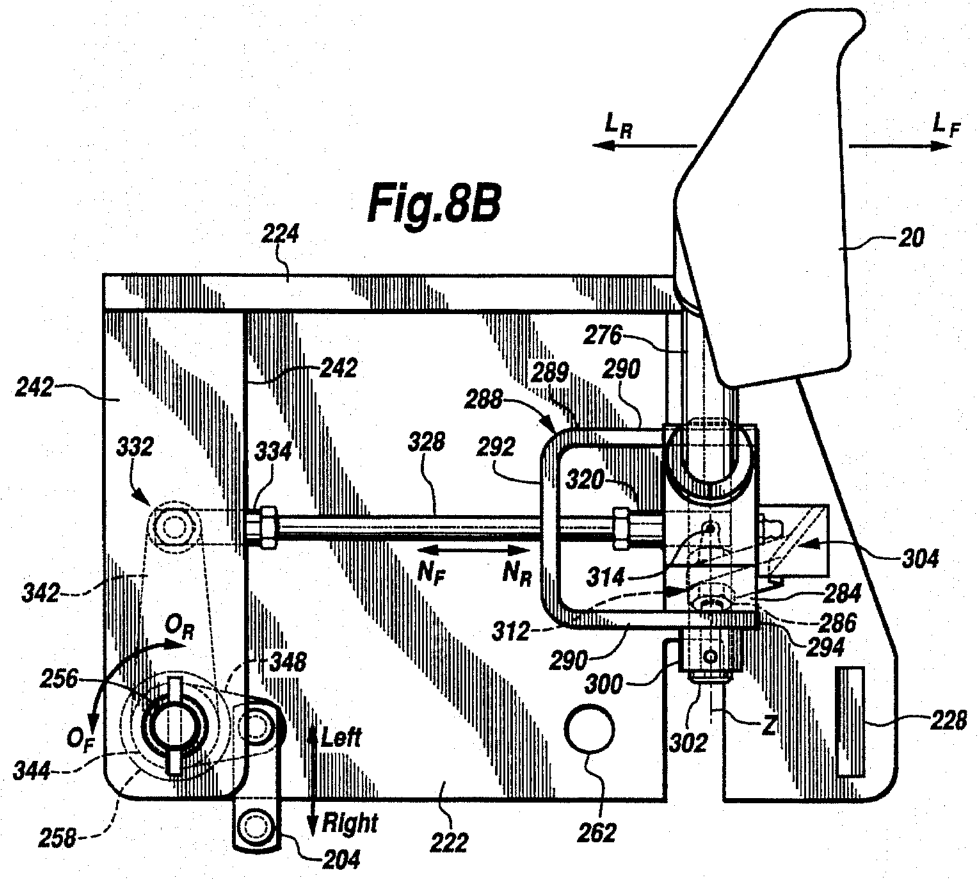
FIG. 8B is a top view of the three-function control mechanism of FIG. 4 illustrating those components involved in the lifting operation of the bulldozer blade.
Figure 8C:
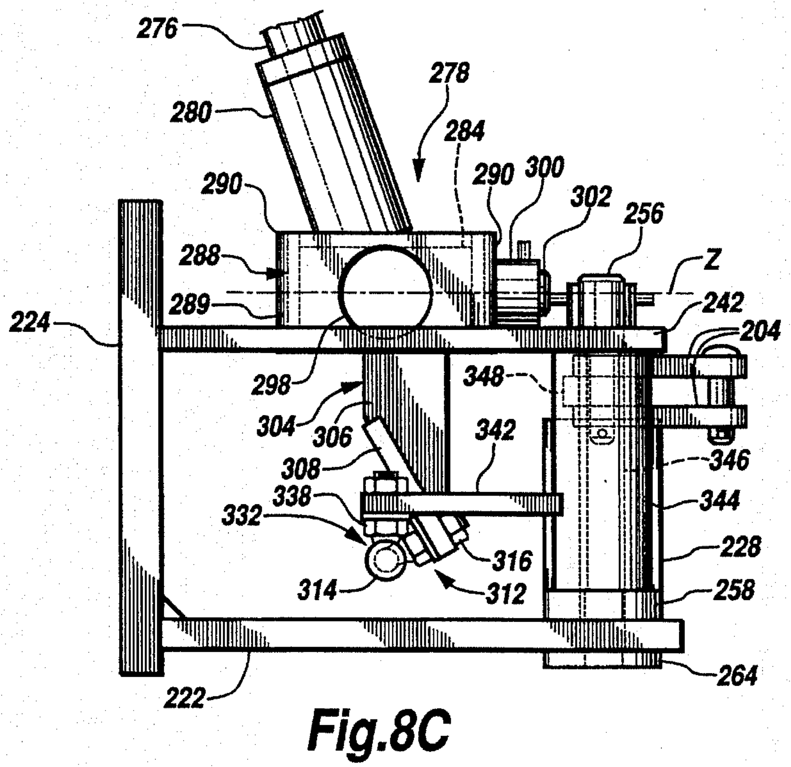
FIG. 8C is an end view of the three-function control mechanism of FIG. 4 illustrating those components involved in the lifting operation of the bulldozer blade.

With reference to FIGS. 8A, 8B, and 8C, the particular components of the three-function control mechanism 200 that are associated with the lift function and the operation of the lift function will be discussed. Most of the remaining components of the three-function control mechanism have been removed for clarity.

The control handle 20 (not shown in FIGS. 8A and 8C) is mounted to the top of a handle shaft 276 that is coupled to a lift bellcrank 278 that forms part of the three-function control mechanism 200. The lift bellcrank 278 has a generally T-shaped configuration with a generally upright leg 280, having a bore 282 that rotatably receives the bottom end of the handle shaft 276, and a cross leg 284 having a through hole 286. As can be seen from FIG. 8C, the upright leg 280 is positioned at an incline with respect to the cross leg 284.

The lift bellcrank 278 is pivotably connected to a lift and tilt bellcrank 288. The lift and tilt bellcrank 288 comprises a generally U-shaped member 289, that has opposing side legs 290 interconnected by a cross-leg 292, and tubular member 293 connected to the cross-leg 292. For clarity the tubular member 293 is not shown in FIGS. 8A, 8B, and 8C. (The tubular member 293 is illustrated in FIGS. 7A–C, and 9A–10C.)

The ends 294 of the side legs 290 are provided with apertures, and the cross-leg 292 is provided with a centrally located through hole 298. One end 294 of one of the side legs 290 is provided with a tubular flange 300 that is aligned with the side leg's aperture. As explained in more detail below, the lift and tilt bell crank 288 is pivotably mounted to the third support member 230 via the through hole 298 of the cross-leg 292. (For clarity, the third support member 230 is not shown in FIGS. 8A, 8B, and 8C.)

The cross leg 284 of the lift bellcrank 278 is pivotably mounted between the ends 294 of the side legs 290 of the lift and tilt bellcrank 288. A pin 302 passing through both apertures of the side-leg 290 and the through hole 286 of the lift bellcrank 278 holds the lift bellcrank 278 in position. Accordingly, when the handle 20 and shaft 276 are moved rearward or forward as indicated by arrows $I_R$ and $L_F$ in FIGS. 8A and 8B, the lift bellcrank 278 is able to pivot about pin 302 with respect to the lift and tilt bellcrank 288. The pivot axis of the pin 302 is represented by axis Z throughout the drawings.

Connected to the cross-leg 284 of the lift bellcrank 278 is a lever arm 304. The lever arm 304 includes a curved segment 306 that initially curves outwardly and downwardly from the cross-leg 284 and then curves inwardly toward the cross-leg 284 while continuing to curve downwardly. (The curvature of the curved segment 306 is best seen in FIG. 8A.) Connected to the curved segment 306 is a flat segment 308 that is positioned at an incline as best shown in FIG. 8C. The end of the flat segment 308 is provided with an aperture to which a ball joint 312 is attached.

The ball joint 312 includes a ball-like termination 314 that is on one end of a coupling 316 that is attached to the flat segment 308 of the lever arm 304. The ball-like termination 314 is seated in a socket provided in one end of a rod coupling 320. At the other end of the rod coupling 320 is a threaded bore 324 that receives an end of a threaded pin 324 of an elongated rod 328.

The rod 328 extends rearwardly where it is connected via a threaded pin 330 to a second ball joint 332 that is similar to the first ball joint 312. The second ball joint 332 likewise includes a rod coupling 334 with a socket and a coupling 338 having a ball-like termination 340 at one end. Unlike the rod coupling 320 of the first ball joint 312 which is situated at an incline, the coupling 338 of the second ball joint 332 is substantially upright as can be best seen in FIGS. 8A and 8C. As explained in more detail below, the ball joints 312 and 332 allow the lever arm 304 to move side to side (as viewed in FIG. 8C) when the control handle 20 is moved side to side in connection with the tilt function of the system (see FIGS. 9A–9C).

The coupling 338 of the second ball joint 332 is mounted to a second lever arm 342 that is connected to a second lift bell crank 344. The second lever arm 342 is substantially flat and extends substantially horizontally from the coupling 338 to the second lift bell crank 344. The second lift bell crank 344 is generally in the shape of a tube that is pivotably mounted between the fifth support member 242 and the circular block 258 attached to the bottom wall 222. The second lift bell crank 344 has a through hole 346 that receives the third pin 256 mentioned above with respect to the control bracket 220. The pin 256 pivotably holds the second lift bell crank 344 in position.

Attached to the second lift bell crank 344 is a third lever arm 348 to which is attached the lift link 204. As explained previously above, the lift link is coupled to the lift spool 104 of the hydraulic valve unit 102.

In operation, the lift spool 104 may be moved to the right (and blade 18 consequently raised) by moving the handle 20 and shaft 276 rearward as indicated by arrow $L_R$. The first lift bellcrank 278 in turn rotates counterclockwise about pin 302 (Z axis) as indicated by arrow $M_R$ (FIG. 8A) with respect to the lift and tilt bellcrank 288. As the lift bellcrank 278 turns counterclockwise, the lever arm 304 also rotates about the pin 302. As the lever arm 304 rotates, however, the flat segment 308 pulls the rod 328 toward the front as indicated by arrow $N_R$.

With reference to FIG. 8B, as the rod 328 moves toward the front, it pulls on the second lever arm 342 causing the lever arm 342 along with the second lift bell crank 344 to rotate clockwise about the pin 256 as indicated by arrow $O_R$. As the second lift bell crank 344 rotates the third lever arm 348 also rotates and pushes the lift link 204 to the right. The movement of the lift link 204 to the right also causes the lift spool 104 to move to the right.

The lift spool 104 may be moved to the left (and blade 18 consequently lowered) by moving the handle 20 and shaft 276 forward as indicated by arrow $L_F$. Lift bellcrank 278 in turn rotates clockwise about pin 302 as indicated by arrow $M_F$ with respect to the lift and tilt bellcrank 288. As the lift bellcrank 278 turns clockwise, the first lever arm 304 also rotates pushing the rod 328 toward the rear as indicated by arrow $N_F$. Movement of the rod 328 toward the rear causes the second lever arm 342 along with the second lift bell crank 344 to rotate counterclockwise about pin 256 as indicated by arrow $O_F$. As the second lift bell crank 344 rotates, the third lever arm also rotates and pulls the lift link 204 and lift spool 104 to the left.

B. The Tilt Function

Figure 9A:
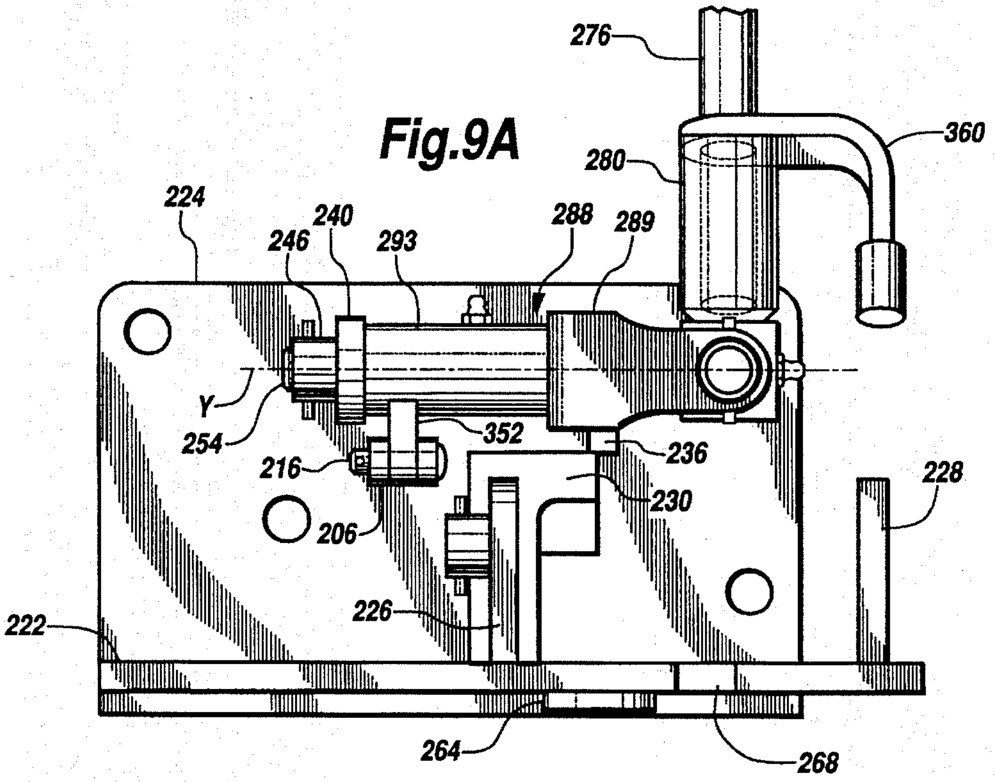
FIG. 9A is a side view of the three-function control mechanism of FIG. 4 illustrating those components involved in the tilting operation of the bulldozer blade.
Figure 9B:
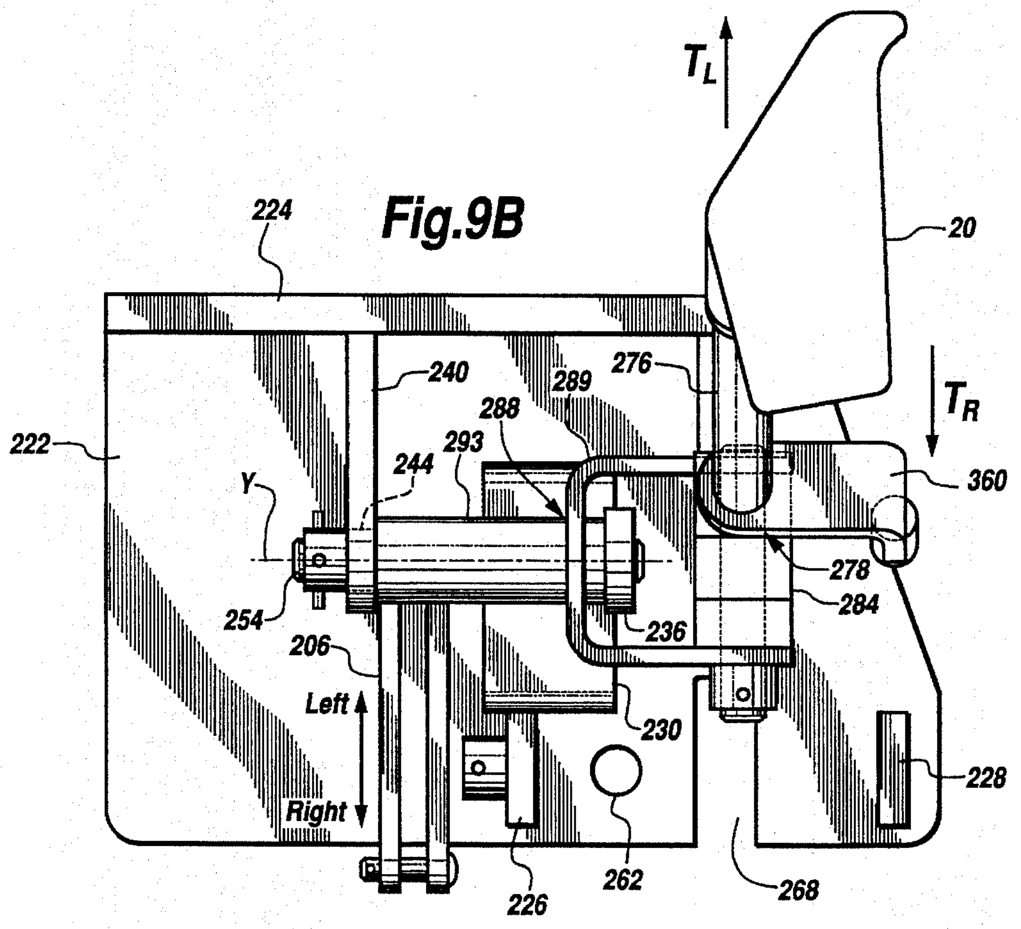
FIG. 9B is a top view of the three-function control mechanism of FIG. 4 illustrating those components involved in the tilting operation of the bulldozer blade.
Figure 9C:
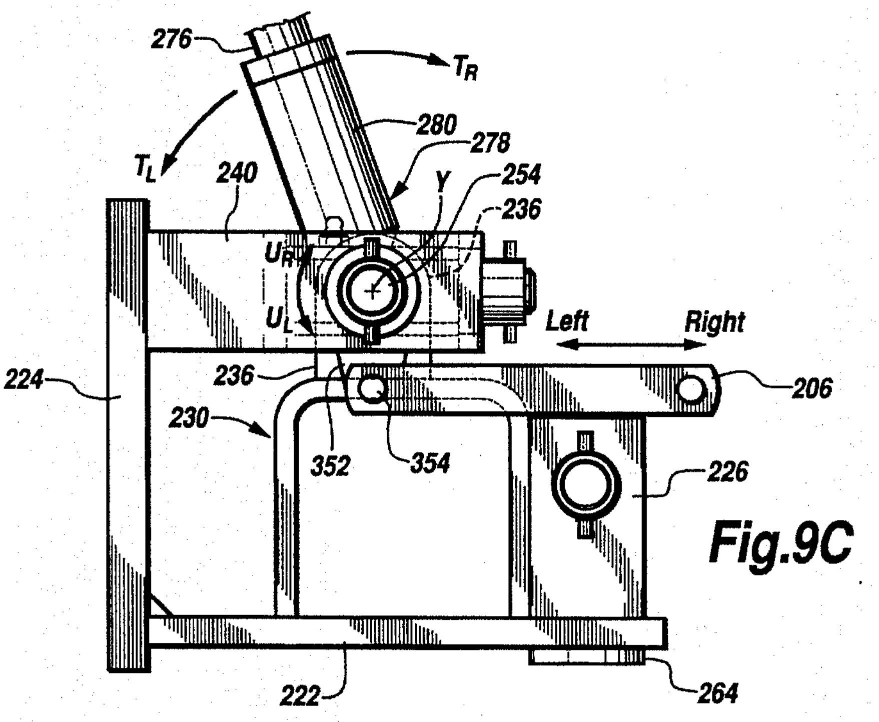
FIG. 9C is an end view of the three-function control mechanism of FIG. 4 illustrating those components involved in the tilting operation of the bulldozer blade.

With reference to FIGS. 9A, 9B, and 9C, the particular components of the three-function control mechanism 200 that are associated with the tilt function and the operation of the tilt function will be discussed. Most of the remaining components of the three-function control mechanism have been removed for clarity.

As explained above, the lift and tilt bellcrank 288 comprises both a U-shaped member 289 and tubular member 293. The tubular member 293 is pivotably mounted between the extension 236 of the third support member 230 and the fourth support member 240. The second pin 254 passes through a hole extending through the tubular member, through a hole in extension 236 of the third support member 230, and through the hole 244 of the fourth support member 240 in order to hold the tubular member 293 in position. Extending below the tubular member 293 is a relatively short lever arm 352. The tilt link 206 is pivotably attached to the lever arm 352 by a pin 354.

In order to tilt the blade, i.e., raise or lower the left upper comer 86 of the blade 18 so that the blade rotates about axis B (FIG. 1), the operator moves the handle 20 and handle 276 to his or her left or right. Referring to FIG. 9B and 9C, when the handle 20 is moved to the operator's left as indicated by arrow $T_L$, the lift bellcrank 278 also moves to the operator's left causing the tubular member 293 of the lift and tilt bellcrank 288 to rotate counterclockwise (as viewed in FIG. 9C) about pin 254 as indicated by arrow $U_L$. The pivot axis of the pin 254 is represented by axis Y throughout the drawings. As the tubular member 293 rotates as indicated by arrow $U_L$, the lever arm 252 also rotates and pushes the tilt link 206 and tilt spool 106 to the right.

When the handle 20 is moved to the operator's right as indicated by arrow $T_R$, the lift bellcrank 278 also moves to the operator's right causing the tubular member 293 of the lift and tilt bellcrank 288 to rotate clockwise (as viewed in FIG. 9C) about pin 254 as indicated by arrow $U_R$. As the tubular member 293 rotates as indicted by arrow $U_R$, the lever arm 252 also rotates and pulls the tilt link 206 and tilt spool 106 to the left.

As mentioned above, when the handle 20 and handle shaft 276 are moved sideways to the left or right, both the lift bellcrank 278 and the lift and tilt bellcrank 288 rotate about the Y axis. As the lift bell crank 278 rotates, so does the first lever 304. In particular, when the lift bell crank 278 rotates to the right about the Y axis, the lever arm 304 moves through an arc to the left, and when the lift bell crank 278 rotates to the left, the lever arm 304 arm moves through an arc to the right. The ball joints 312 and 332 connected to the rod 328 permit the lever arm 304 to move in such a manner without causing the second lever arm 342 and second lift bell crank 344 to move (and, therefore, not causing the lift link 204 to move). The first ball joint 312 along with the rod 328 will move with the lever arm 304 when the handle 20 is moved side to side; however, the second ball joint 332 will remain essentially in the same location. The ball-like terminations 314 and 340 of the ball joints 312 and 332 will pivot in their respective sockets and allow the rod 328 to move without causing the second lever arm 342 to move.

C. The Angle Function

The angle function of the control mechanism 200 will now be described in more detail. With reference to FIGS. 10A, 10B, 10C, and 11A and 11B, angling of the blade 18 to the left or right is accomplished by twisting the handle 20 clockwise or counterclockwise about axis X extending longitudinally through the center of the handle shaft 276.

Fixed to the handle shaft 276 is a bent control lever 360 that extends forwardly from the shaft 276 and then downward. Threadingly attached to the end 362 of the control lever 360 is a first right-angle ball joint 364. The first right-angle ball joint 364 comprises a coupling 363 attached to the end 362 of the control lever 360 and a rod coupling 365 that is threadingly attached to a first end of a threaded rod 368. The coupling 363 has a ball-like termination 366 that is seated in a socket provided in the rod coupling 365. The rod 368 extends toward the right at an upward incline and has a second end to which a second right-angle ball joint 372 is attached. The second right-angle ball joint 372 is similar in construction as the first right-angle ball joint 364 having a coupling 373 with a ball-like termination that is seated in a socket of a rod coupling 375.

The second right-angle ball joint 372 is also coupled to an angle bellcrank 374. The angle bellcrank 374 has a tubular portion 376 that is positioned substantially horizontally between the first and second vertical support members 226 and 228 of the control bracket 220. First pin 252 passes through the apertures 232 and 234 of the support members 226 and 228 and through a through hole of the tubular portion 376 of the angle bellcrank 374, thereby holding the angle bellcrank 374 pivotably in position.

Extending upwardly from the tubular portion 376 of the angle bellcrank 374 is a first or input lever arm 380 that is pivotably attached to the second right angle ball joint 372. Also extending upwardly from the tubular portion is a shorter, second or output lever arm 382. The second or output lever arm 382 is pivotably attached to the angle link 208. A third lever arm 384 extends downwardly from the tubular portion 376, through the slot 268 provided in the bottom wall 222 of the control bracket, and is coupled to a torque amplifying device 386.

As explained in more detail further below, the torque amplifying device 386 provides additional input force or torque to the first or input lever arm 380. When the handle 20 is twisted clockwise as indicated by arrowhead CW in FIG. 10B, the control lever 360 turns with the shaft 276 and pushes the rod 368 toward the right at an angle as indicated by arrow $I_{CW}$ (FIG. 10C). The rod 368 in turn pushes the first or input lever arm 380 to the right causing the angle bellcrank 374 (with the tubular portion 376) to rotate clockwise about pin 252 as indicated by arrow $J_{CW}$. As the angle bellcrank 374 rotates clockwise, the second or output lever arm 382 moves to the right pushing the angle link 208 and angle spool 108 to the right as indicated by arrowhead RIGHT.

When the handle 20 is twisted counterclockwise (arrowhead CCW), the control lever 360 rams with the shaft 276 and pushes the rod 368 to the left at an angle as indicated by arrow $I_{CCW}$. The rod 368 in turn causes the first or input lever arm 380 to move to the left and the angle bellcrank 374 to rotate counterclockwise about pin 252 as indicated by arrow $J_{CCW}$. As the angle bellcrank 352 rotates counterclockwise, the second or output lever arm moves to the left pulling the angle link 208 and the angle spool 108 to the left as indicated by arrowhead LEFT.

Shaft bearings 388 are provided in the bore 282 of the lift bellcrank 278 so that when the handle 20 and handle shaft 276 are twisted, the lift bellcrank 278 (and consequently the lift and tilt bellcrank 288) remain stationary. Furthermore, when the handle 20 and handle shaft 276 are moved to the front or rear or side-to-side, the first and second ball joints 364 and 372 allow the control lever 360 and rod 368 to move with the handle shaft 276 without causing the angle bellcrank 374 to move. The first ball joint 364 allows relative pivoting of the control lever 360 with respect to the rod 368, and the second ball joint 372 allows relative pivoting of the rod 368 with respect to the angle bellcrank 374.

The human wrist has a limited amount of twisting motion available, which predetermines the lever ratios required to move the valve spool 108 the necessary distance. Consequently, the lever advantage produced when the handle 20 and shaft 276 are twisted by an operator is likewise limited. In some cases the resulting twisting force may be inadequate to overcome the spring force of the angle spool 108. The torque amplifying device 386, therefore, provides an additional assist to the first or input lever arm 380 so that sufficient force can be produced to overcome the spring force of the angle spool 108. In particular, the torque amplifying device 386 adds torque about the pivot pin 252, thus increasing the force to the input and output levers 380 and 382 when the input lever 380 is rotated.

Figure 10A:
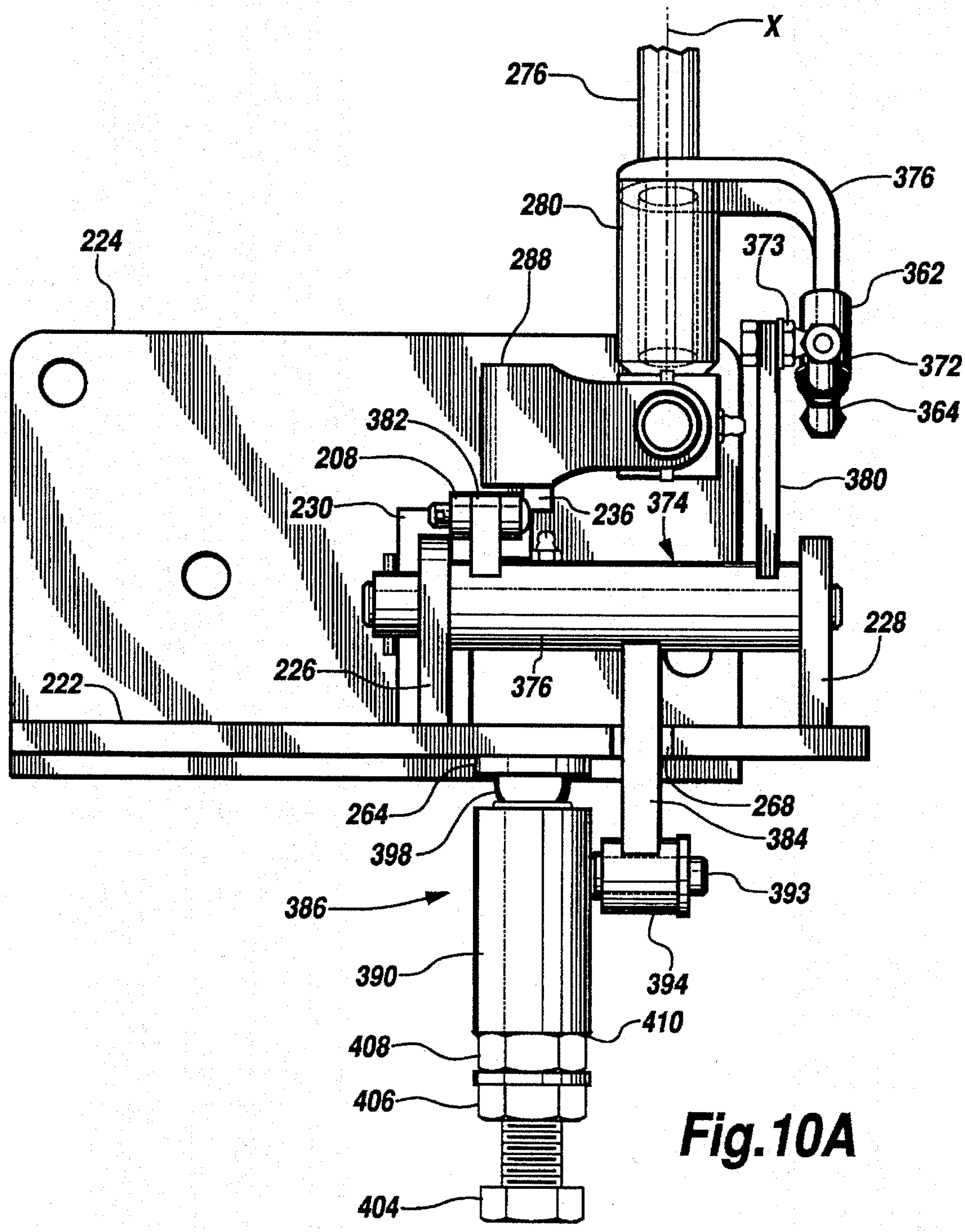
FIG. 10A is a side view of the three-function control mechanism of FIG. 4 illustrating those components involved in the angling operation of the bulldozer blade, including a torque-amplifying device.
Figure 10B:
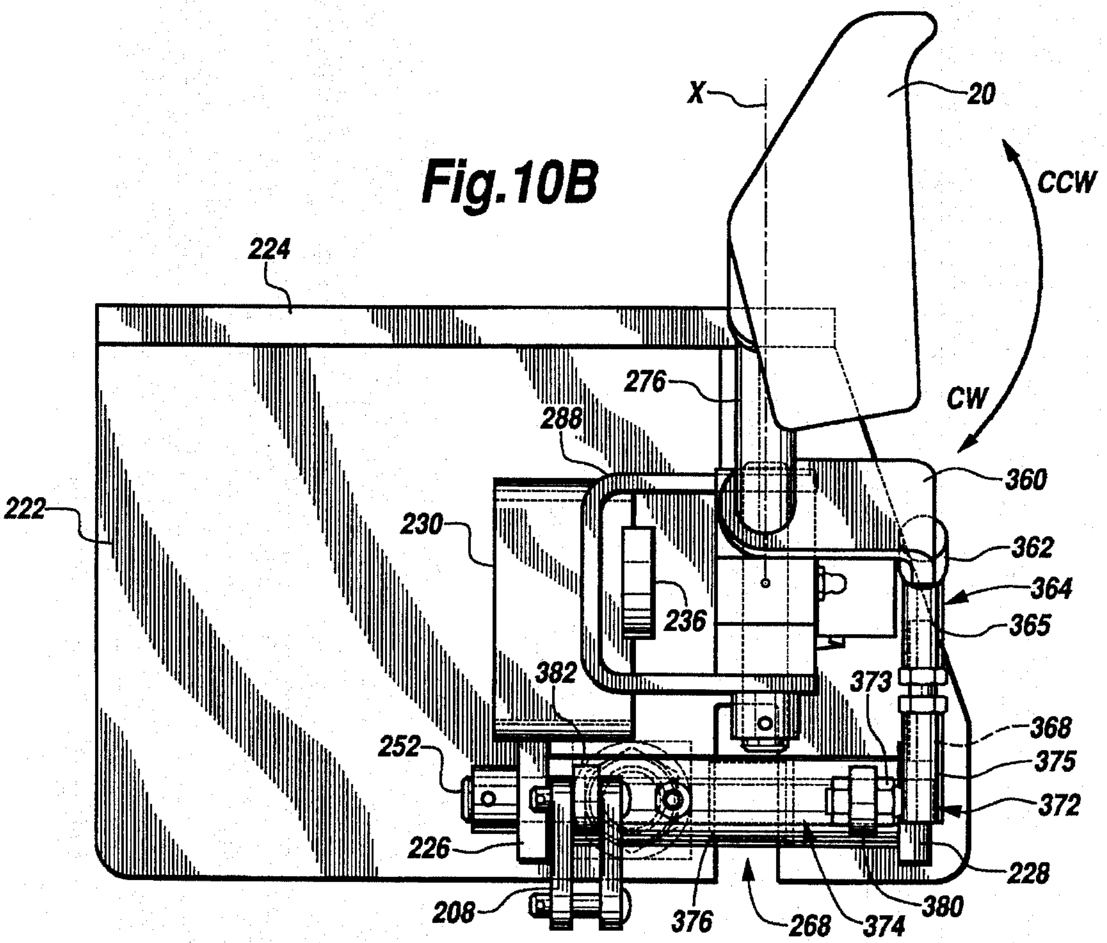
FIG. 10B is a top view of the three-function control mechanism of FIG. 4 illustrating those components involved in the angling operation of the bulldozer blade, including a torque-amplifying device.
Figure 10C:
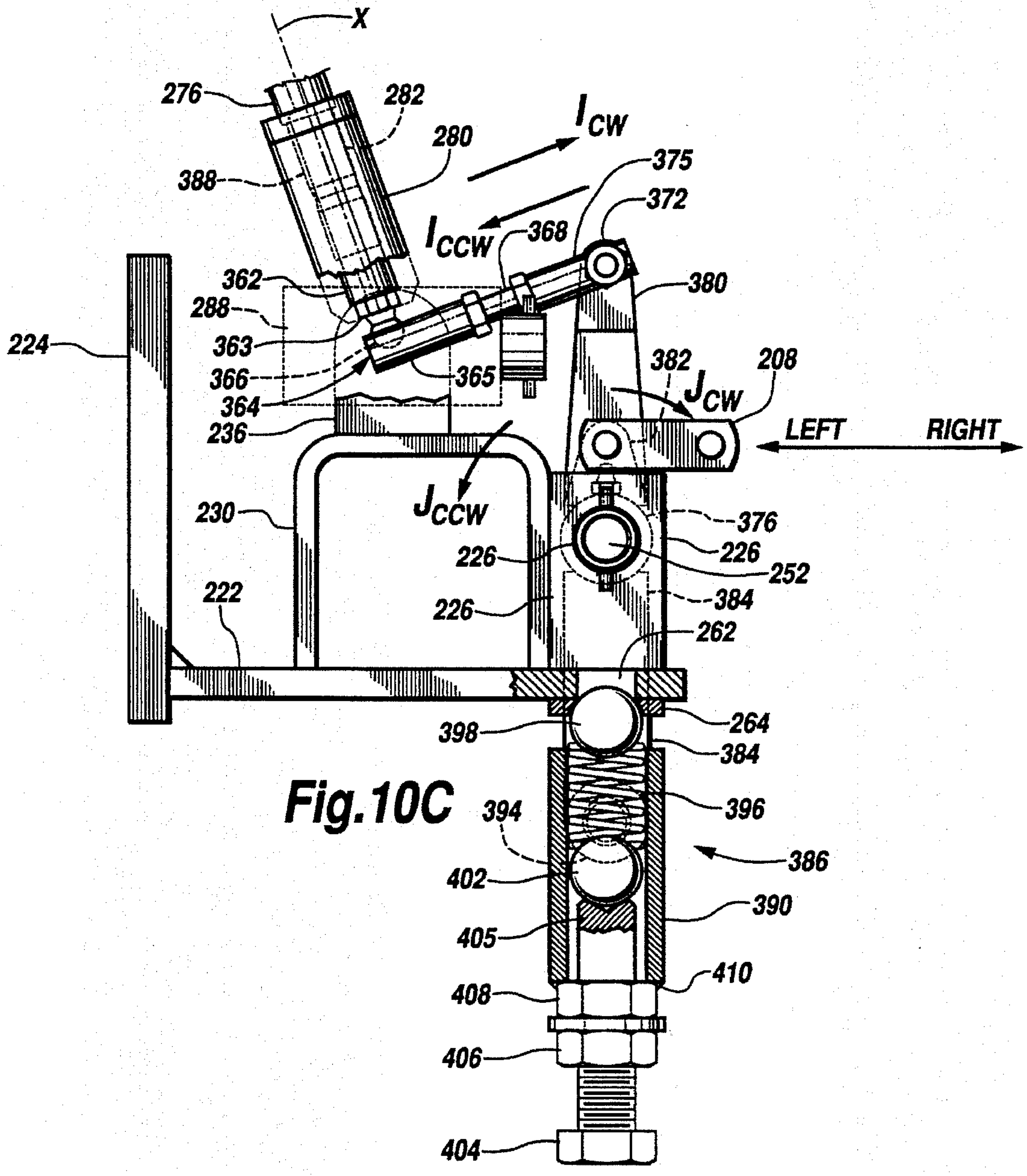
FIG. 10C is an end view of the three-function control mechanism of FIG. 4 illustrating those components involved in the angling operation of the bulldozer blade, including a torque-amplifying device.

The torque amplifying device 386 comprises a tubular housing 390 with a pivot pin 393 extending outwardly from the front of the housing 390 (FIG. 10A). The pivot pin 382 is pivotably received in a flange member 394 attached to the end of the third lever arm 384. Positioned within the tubular housing 390 is a compression spring 396 (FIG. 10C). The top of the spring 396 preferably protrudes slightly from the upper end of the tubular housing 390 forming a seat for a first hardened sphere 398.

The first hardened sphere 398 is also seated against the hardened seat 264 attached to the underside of the bottom wall 222. The top of the spring 396 forces the first hardened sphere against the hardened seat 264. Seated against the lower end of the spring 396 is a second hardened sphere 402. An adjustment screw 404 having a detented end 405 bears against the lower surface of the second hardened sphere 402. A lock nut 406 positioned between the lower end of the housing 390 and the head of the adjustment screw 404 can be adjusted to modify the force applied by the screw 404 to the second sphere 402.

To assist in holding the adjustment screw 404 coupled to the housing 390, a weld nut 408 is attached to the lower end of the housing 390. The weld nut 408 is fixed to the housing 390 by welds 410. The adjustment screw 404 is threaded through the weld nut 408 as shown and held in position. The lock nut 406 locks the adjustment screw in position, preventing the adjustment screw 404 from unscrewing from the weld nut 408. Although a weld nut 408 is shown used to hold the adjustment screw 404 coupled to the housing 390, the weld nut 408 could be removed and the lower end of the housing adapted to threadingly hold the adjustment screw 404. The opening at the lower end of the housing 390 could be sized to fit the adjustment screw 404 and provided with threads to grasp and hold the adjustment screw 404.

Figure 11A:
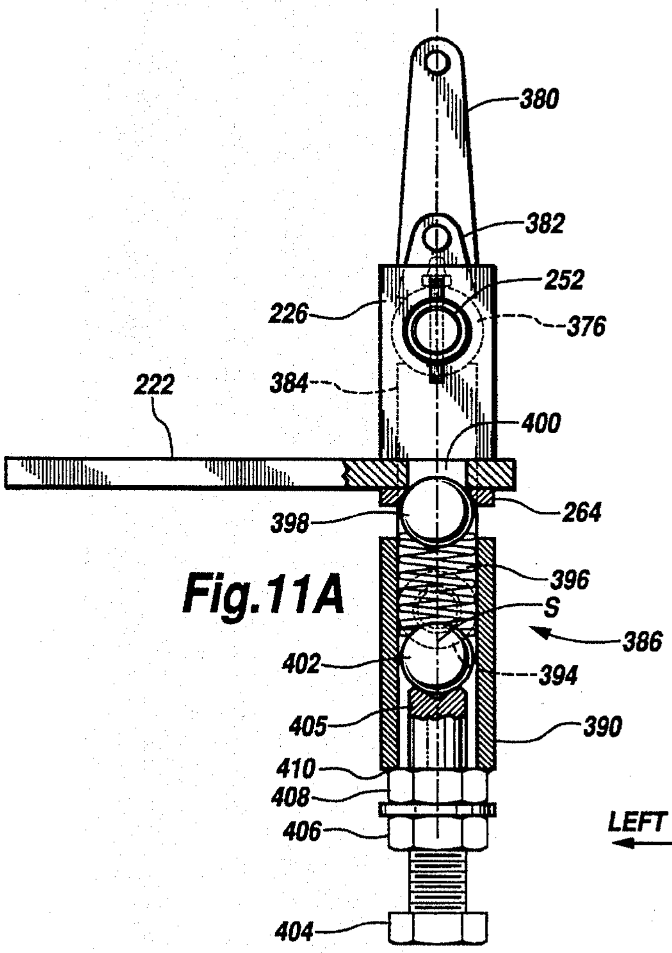
FIG. 11A is an end view of the angle bellcrank and torque-amplifying device shown in a neutral position.

With reference to FIG. 11A, when the handle has not been twisted either clockwise or counterclockwise, i.e. is in a neutral position, the spring force of the angle spool 108 holds the input and output lever arms 380 and 382 in an essentially upright position as shown. The housing 390 of the torque amplifying device 386 likewise is aligned in an essentially upright position. In this neutral or upright position, the compression spring 396 of the torque amplifying device 386 has no effect on the input or output levers 380 and 382. The spring 396, therefore, does not act to force the flange 394 and lower lever arm 384 to rotate about the pivot pin 252. In other words, the length of the torque arm (the perpendicular distance from the center force line of the spring 396 S to the pin 252) produced by the spring 396 is zero.

When the handle 20 and handle shaft 276 are twisted either clockwise or counterclockwise, the input and output lever arms 380 and 382 pivot to either the right or left about the pivot pin 252. The third lever arm 384 which extends below the angle bellcrank 374 in mm pivots to either the left or right about the pivot pin 252.

Figure 11B:
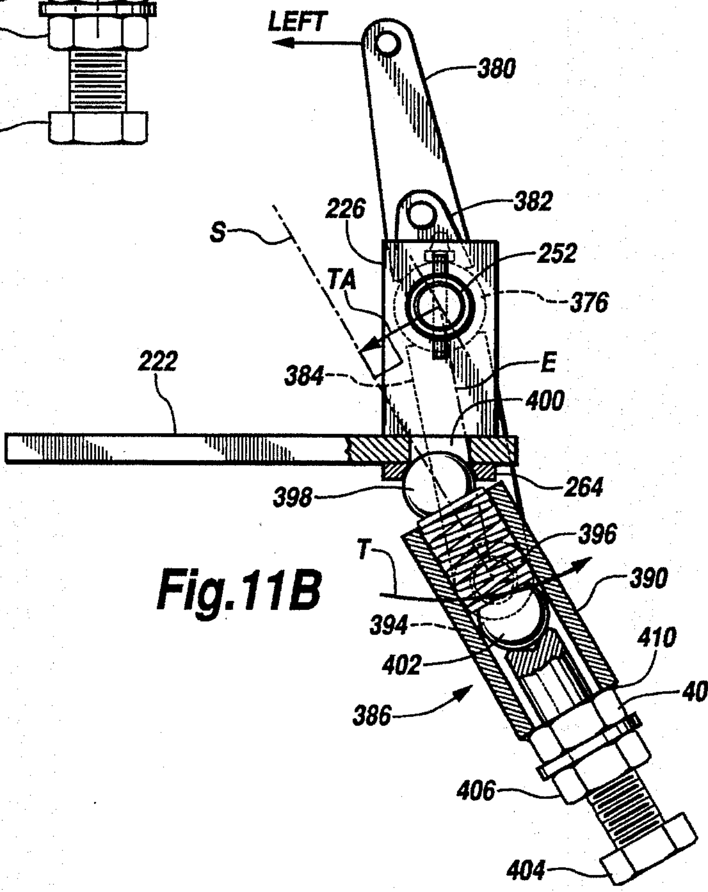
FIG. 11B is an end view of the angle bellcrank and torque-amplifying device shown in a rotated position.

FIG. 11B shows the input and output lever arms 380 and 382 pivoted to the left. Such movement causes the third lever arm 384 to pivot about the pin 252 and move to the right as shown. As the third lever arm 384 moves to the right, it pulls the flange 394 and the housing 390 of the torque amplifying device 386 to the right. The housing 390, however, rather than pivoting about the pin 252 pivots about the first hardened sphere 398. The spring 396 within the housing 390 slides over the surface of the first hardened sphere as the housing 390 is pulled to the right. The housing 390 and center force line S of the spring 396 therefore are no longer aligned with the pivot pin 252 of the third lever arm 384 (line E) but rather are pulled off center.

Once the housing 390 and spring 396 of the torque amplifying device 386 are pulled off center, the force of the spring 396 produces a torque T about pivot 252 due to the moment arm TA thereby adding a force to the rotating lever arms 380 and 382. The amount of torque T added may be adjusted by changing the initial compression of the spring by turning the adjustment screw 404, or by removing the adjustment screw 404 and second hardened sphere 402 and installing a different spring in the housing 390.

Whereas the torque amplifying device 386 is described with reference to assisting the lever action associated with the tilt function of the assembly, the torque amplifying device may also be used to assist any of the other two functions or may be used to assist pivoting levers used in other mechanical control linkage systems. The arrangement of the torque amplifying device 386 with respect to the lever arm 380 needing assist is such that the device 386 takes up minimal space and therefore does not add significantly to the amount of space needed to house the entire control linkage system.

With the above-described three-function control mechanism 200, an operator of the bulldozer 10 can individually or simultaneously lift, tilt, or angle the blade 18. The operator can merely move a single handle 20 forward or backward, and/or side-to-side, and/or clockwise or counter-clockwise and thereby actuate individually or simultaneously corresponding valve spools 104, 106, and 108. Movement of the handle in one of the aforementioned directions, however, will only cause the corresponding valve spool to move and will not effect the other valve spools.

While only one embodiment of the invention has been shown and described, it should be recognized that other variations, substitutions, or modifications will occur to those skilled in the art. For example, the control mechanism may be used in an environment other than a vehicle such as the bulldozer described herein. Furthermore, if the control mechanism is used with a bulldozer or a like vehicle, the hydraulic valve unit may have a different configuration or there may be fewer or more hydraulic cylinders than described herein. Furthermore, the torque amplifying device 386 can be used in other control linkage systems to assist a pivoting lever. Any such variations, substitutions, and modification are intended to fall within the scope of the invention as defined in the appended claims.

I claim:

1. A three-function control mechanism comprising:

a control bracket;

a control handle movable between a neutral position and an activated position;

control linkage operatively coupled to said control handle and to a first actuator, a second actuator, and a third actuator, said control linkage comprising:

a control bellcrank rotatably coupled to said control bracket such that said control bellcrank is rotatable about a first axis, an input control lever mounted to said control bellcrank and coupled to said control handle, and an output control lever mounted to said control bellcrank and operatively coupled to said first actuator, wherein said input control lever and said output control lever are rotatable with said control bellcrank about said first axis; and a torque-amplifying device comprising:

a torque-assist lever mounted to said control bellcrank such that said torque-assist lever is rotatable about said first axis together with said control bellcrank, a housing pivotably connected to said torque-assist lever such that said housing is pivotable with respect to said torque-assist lever about a second axis, said housing having a chamber and at least one opening to said chamber, a compression spring positioned within said chamber of said housing, said compression spring having a first end positioned near said opening of said chamber and a second end, and a pivot coupled to said first end of said compression spring and to said control bracket whereby said compression spring is pivotable about a third axis with respect to said control bracket;

wherein said first, second and third axes lie substantially within the same plane when said control handle is in said neutral position, and said third axis lies substantially out of said plane when said control handle is in said activated position.

2. A three-function control mechanism according to claim 1, wherein said control linkage further comprises:

a first bellcrank, wherein an end of said control handle is rotatably mounted to said first bellcrank such that said control handle is rotatable about a fourth axis with respect to said first bell crank;

a second bellcrank rotatably mounted to said control bracket such that said second bellcrank is rotatable about a fifth axis with respect to said control bracket, wherein said first bellcrank is rotatably mounted to said second bellcrank such that said first bellcrank is rotatable about a sixth axis with respect to said second bellcrank;

first linkage having a first end and a second end, wherein said first end of said first linkage is mounted to said first bellcrank and said second end of said first linkage is operatively coupled to said second actuator;

second linkage having a first end and a second end, wherein said first end of said second linkage is mounted to said second bellcrank and said second end of said second linkage is operatively coupled to said third actuator; and third linkage having a first end and a second end, wherein said first end of said third linkage is mounted to said control handle and said second end of said third linkage is mounted to said input control lever;

wherein said control handle may be moved in first and second opposing directions such that said control handle rotates about said fourth axis causing said third linkage, said input control lever, said control bellcrank, said output control lever, and consequently said first actuator to move, wherein said control handle may be moved in third and fourth opposing directions such that said control handle and said first bellcrank rotate about said sixth axis causing said first linkage and consequently said second actuator to be move, and wherein said control handle may be moved in fifth and sixth opposing directions such that said control handle and second bellcrank rotate about said fifth axis causing said second linkage and consequently said third actuator to move.

3. A control device comprising:

a control bracket;

an input control lever;

an output control lever adapted to be coupled to an actuator;

a control lever pivot assembly mounted to said control bracket such that at least a portion of said control lever pivot assembly is pivotable about a first axis, wherein said input control lever and said output control lever are attached to said control lever pivot assembly such that said input control lever and said output control lever are pivotable about said first axis between a neutral position and an activated position;

a torque-amplifying device comprising:

a torque-assist lever attached to said control lever pivot assembly such that said torque assist lever is pivotable about said first axis with said input control lever and said output control lever;

a housing pivotably connected to said torque-assist lever such that said housing is pivotable with respect to said torque-assist lever about a second axis, said housing having a chamber and at least one opening to said chamber;

a compression spring positioned within said chamber of said housing, said spring having a first end positioned near said opening of said chamber and a second end; and a pivot coupled to said first end of said compression spring and to said control bracket whereby said compression spring is pivotable about a third axis with respect to said control bracket;

wherein said first, second and third axes lie substantially within the same plane when said input and output control levers are in said neutral position, and said third axis lies substantially out of said plane when said input and output control levers are in said activated position.

4. A control device according to claim 3, wherein said pivot of said torque-amplifying device comprises a hardened sphere that is seated against said first end of said spring and against said control bracket, and wherein said third axis substantially extends through said hardened sphere.

5. A control device according to claim 3, wherein said torque-amplifying device further comprises a pivot assembly interconnecting said housing and said torque-assist lever, said pivot assembly comprising a pivot pin fixedly connected to one of either said housing or said torque-assist lever and a pivot housing fixedly connected to the other of said housing or said torque-assist lever wherein said pivot pin is received in said pivot housing and said pivot housing and pivot pin are rotatable with respect to each other, and wherein said second axis extends substantially through said pivot pin.

6. A control device according to claim 5, wherein said pivot assembly is coupled to a side of said housing such that said third axis lies between said between said first and second axes when said input and output control levers are in said neutral position.

7. A control device according to claim 3, further comprising an adjustment device coupled to said second end of said compression spring.

8. A control device according to claim 7, wherein said adjustment device comprises an adjustment screw threadingly coupled to said housing and pressingly coupled to said second end of said compression spring.

9. A control device according to claim 8, wherein said adjustment device further comprises a weld nut fixed to said housing, said adjustment screw being threadingly received in said weld nut, and a lock nut.

10. A control device according to claim 3, wherein said control lever pivot assembly comprises a pivot pin mounted to said control bracket and a pivot housing, wherein said pivot pin is received in said pivot housing such that said pivot housing is rotatable about said pivot pin, and wherein said input lever, said output lever, and said torque-assist lever are attached to said pivot housing.

11. A control device according to claim 10, wherein said input lever and said output lever are attached substantially to one side of said pivot housing and said torque-assist lever is substantially attached to an opposite side of said pivot housing.

12. A work vehicle comprising:

a supporting body;

driving means coupled to said supporting body for propelling the supporting body;

a working member coupled to said supporting body;

at least three actuators operatively coupled to said working member; and a control mechanism operatively coupled to said actuators, said control mechanism comprising:

a control bracket;

a control lever comprising a handle shaft having a first end and a second end;

a first bellcrank, said first end of said handle shaft being rotatably mounted to said first bellcrank such that said handle shaft is rotatable about a first axis;

a second bellcrank rotatably mounted to said control bracket such that said second bellcrank is rotatable about a second axis with respect to said control bracket, and wherein said first bellcrank is rotatably mounted to said second bellcrank such that said first bellcrank is rotatable about a third axis with respect to said bellcrank;

a third bellcrank coupled to said first bellcrank, said third bellcrank being rotatably mounted to said control bracket such that said third bellcrank is rotatable about a fourth axis with respect to said control bracket;

first linkage having a first end and a second end, wherein said first end of said first linkage is mounted to said first bellcrank and said second end of said first linkage is operatively coupled to said first actuator;

second linkage having a first end and a second end, wherein said first end of said second linkage is mounted to said second bellcrank and said second end of said second linkage is operatively coupled to said second actuator;

third linkage having a first end and a second end, wherein said first end of said third linkage is mounted to said third bellcrank and said second end of said third linkage is operatively coupled to said third actuator;

fourth linkage having a first end and a second end, wherein said first end of said third linkage is mounted to said handle shaft and said second end of said third linkage is mounted to said third bellcrank; and a torque-amplifying device coupled to said third bellcrank, comprising:

a torque-assist lever connected to said third bellcrank such that said torque-assist lever is pivotable about said fourth axis with said third bellcrank;

a housing pivotably connected to said torque-assist lever such that said housing is pivotable with respect to said torque-assist lever about a fifth axis, said housing having a chamber and at least one opening to said chamber;

a compression spring positioned within said chamber, said spring having a first end positioned near said opening of said housing and a second end;

a pivot coupled to said first end of said compression spring and to said control bracket whereby said compression spring is pivotable about a sixth axis with respect to said control bracket;

wherein said control lever may be moved in first and second opposing directions such that said control lever and said first bellcrank rotate about said third axis causing said first linkage to move, wherein said control lever may be moved in third and fourth opposing directions such that said control lever and second bellcrank rotate about said second axis causing said second linkage to move, and wherein said control lever may be moved in fifth and sixth opposing directions such that said control lever rotates about said first axis causing said fourth linkage, said third bellcrank, and said third linkage to move.

13. The work vehicle of claim 12, wherein said first actuator comprises a first hydraulic valve and at least one hydraulic cylinder operatively coupled to both said first hydraulic valve and said working member, said second actuator comprises a second hydraulic valve and at least one hydraulic cylinder operatively coupled to both said second hydraulic valve and said working member, and said third actuator comprises a third hydraulic valve and at least one hydraulic cylinder operatively coupled to both said third hydraulic valve and said working member;

whereby extension or retraction of said hydraulic cylinder of said first actuator causes said working member to raise or lower, extension or retraction of said hydraulic cylinder of said second actuator causes said working member to tilt about a tilt axis, and extension or retraction of said hydraulic cylinder of said third actuator causes said working member to angle about an angle axis.

14. The work vehicle of claim 13, wherein said first, second, and third hydraulic valves each are provided with a respective valve spool, said valve spools being substantially aligned in a row; and wherein one end of said valve spool of said first hydraulic valve is mounted to said second end of said first linkage, one end of said valve spool of said second hydraulic valve is mounted to said second end of said second linkage, and one end of said valve spool of said third hydraulic unit is mounted to said second end of said third linkage.

* * * * *